United States Patent
Oishi et al.

(10) Patent No.: US 9,729,462 B2
(45) Date of Patent: Aug. 8, 2017

(54) TRANSMISSION APPARATUS AND TRANSMISSION METHOD

(71) Applicant: FUJITSU LIMITED, Kawasaki-shi, Kanagawa (JP)

(72) Inventors: Shigeki Oishi, Fukuoka (JP); Tsutomu Noguchi, Fukuoka (JP); Hideyo Fukunaga, Fukuoka (JP); Feng Zhang, Fukuoka (JP); Michihiko Goto, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 175 days.

(21) Appl. No.: 14/518,167

(22) Filed: Oct. 20, 2014

(65) Prior Publication Data
US 2015/0124602 A1 May 7, 2015

(30) Foreign Application Priority Data

Nov. 6, 2013 (JP) .................. 2013-230663

(51) Int. Cl.
*H04L 12/863* (2013.01)
*H04L 12/873* (2013.01)

(52) U.S. Cl.
CPC .......... *H04L 47/621* (2013.01); *H04L 47/527* (2013.01)

(58) Field of Classification Search
CPC ......... H04L 12/18; H04L 12/46; H04L 12/56; H04L 12/64; H04L 41/02; H04L 41/50; H04L 45/00; H04L 45/74; H04L 47/10; H04L 47/11; H04L 47/12; H04L 47/14; H04L 47/19; H04L 47/20; H04L 47/21;
(Continued)

(56) References Cited

U.S. PATENT DOCUMENTS 6,138,172 A  10/2000 Shimonishi
6,535,512 B1 * 3/2003 Daniel ............... H04L 12/5601
                                                         370/395.1
(Continued)

FOREIGN PATENT DOCUMENTS

JP  11-41316    2/1999
JP  11-298523   10/1999
(Continued)

OTHER PUBLICATIONS

Shreedhar, M.; Varghese,G. (Oct. 1995). "Efficient fair queueing using deficit round robin". ACM SIGCOMM Computer Communication Review 25 (4): 231. doi:10.1145/217391.217453. ISSN 0146-4833 teaches about storing user data in queue, link list to store output order, issuing permissible amount to queue and output data based on amount permitted.*

(Continued)

*Primary Examiner* — Siming Liu
(74) *Attorney, Agent, or Firm* — Staas & Halsey LLP

(57) ABSTRACT

There is provided a transmission apparatus including: a buffer provided with a queue for each of user flows, the buffer configured to store data in the queue for the user flow to which the data belongs; a storage unit configured to store a link list indicating an output order of the user flows; an issuing unit configured to issue a predetermined output permissible amount to the queue for the user flow by referring to the link list; and an output control unit configured to output data from the queue to which the output permissible amount is issued.

8 Claims, 19 Drawing Sheets

(58) Field of Classification Search
CPC ......... H04L 47/22; H04L 47/24; H04L 47/28; H04L 47/527; H04L 47/621
See application file for complete search history.

(56) References Cited

U.S. PATENT DOCUMENTS

| | | | | |
|---|---|---|---|---|
| 2002/0114277 | A1* | 8/2002 | Kyusojin | H04L 12/2602 370/230.1 |
| 2002/0131421 | A1* | 9/2002 | Reshef | H04L 12/5602 370/395.72 |
| 2005/0068974 | A1* | 3/2005 | Barker | H04L 49/103 370/419 |
| 2005/0243847 | A1* | 11/2005 | Bitar | H04L 12/5693 370/412 |
| 2006/0221978 | A1* | 10/2006 | Venkatachalam | H04L 47/524 370/395.41 |
| 2007/0156834 | A1* | 7/2007 | Nikolov | G06F 9/5016 709/207 |
| 2007/0291645 | A1* | 12/2007 | Ryu | H04L 12/5693 370/235 |
| 2009/0168790 | A1* | 7/2009 | Lee | H04L 12/5693 370/412 |
| 2014/0195545 | A1* | 7/2014 | Anand | H04L 45/7453 707/747 |

FOREIGN PATENT DOCUMENTS

| | | |
|---|---|---|
| JP | 2002-300577 | 10/2002 |
| JP | 2009-135810 | 6/2009 |

OTHER PUBLICATIONS

Nishimura et al., "Proposal for Ultra-High Speed Scheduling Architecture", IEICE Technical Report, Information and Communication Engineers, vol. 113, No. 6, The Institute of Electronics, Apr. 11, 2013, pp. 7-12.

Japanese Office Action dated May 23, 2017, in corresponding Japanese Patent Application No. 2013-230663.

* cited by examiner

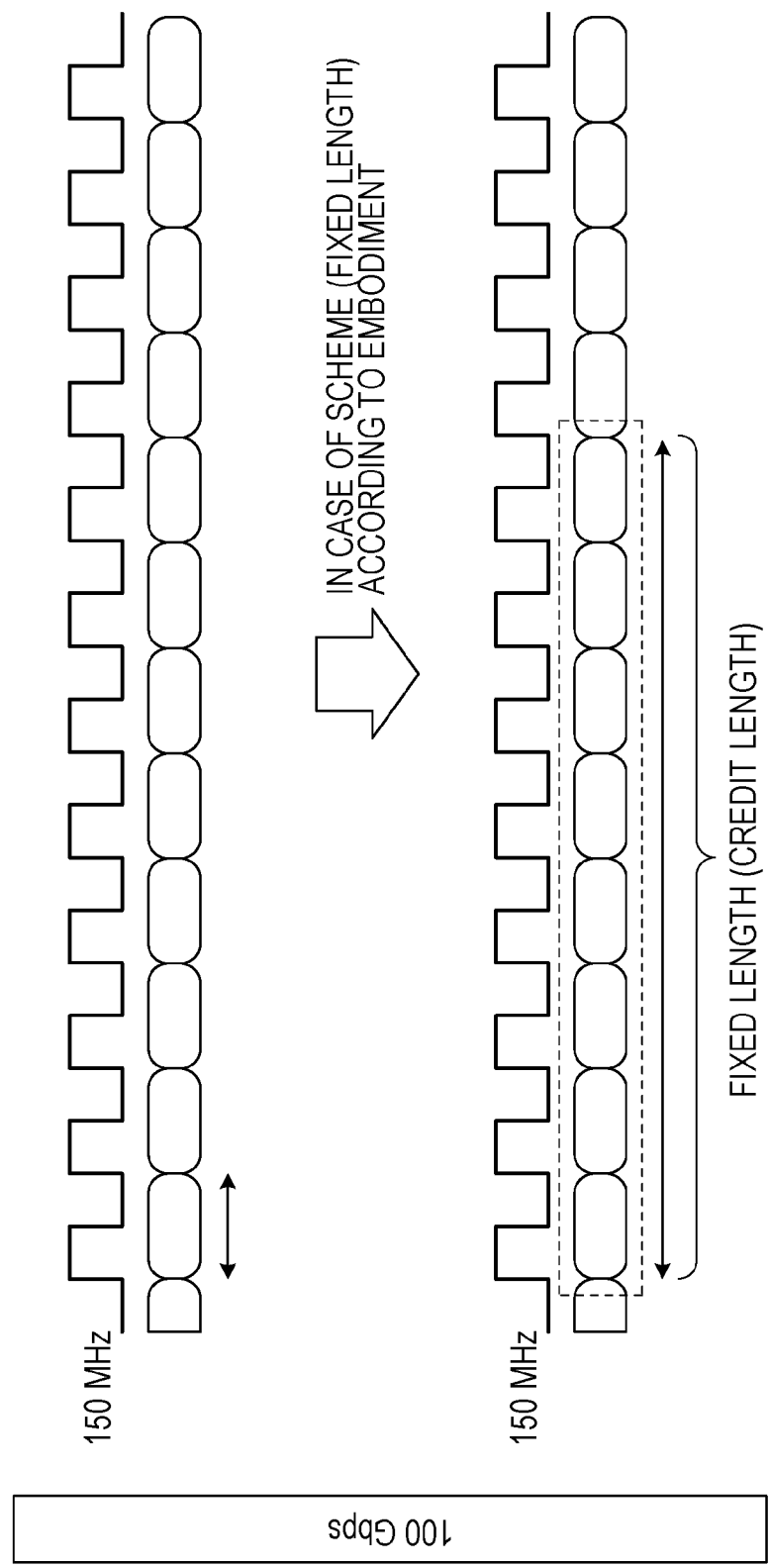

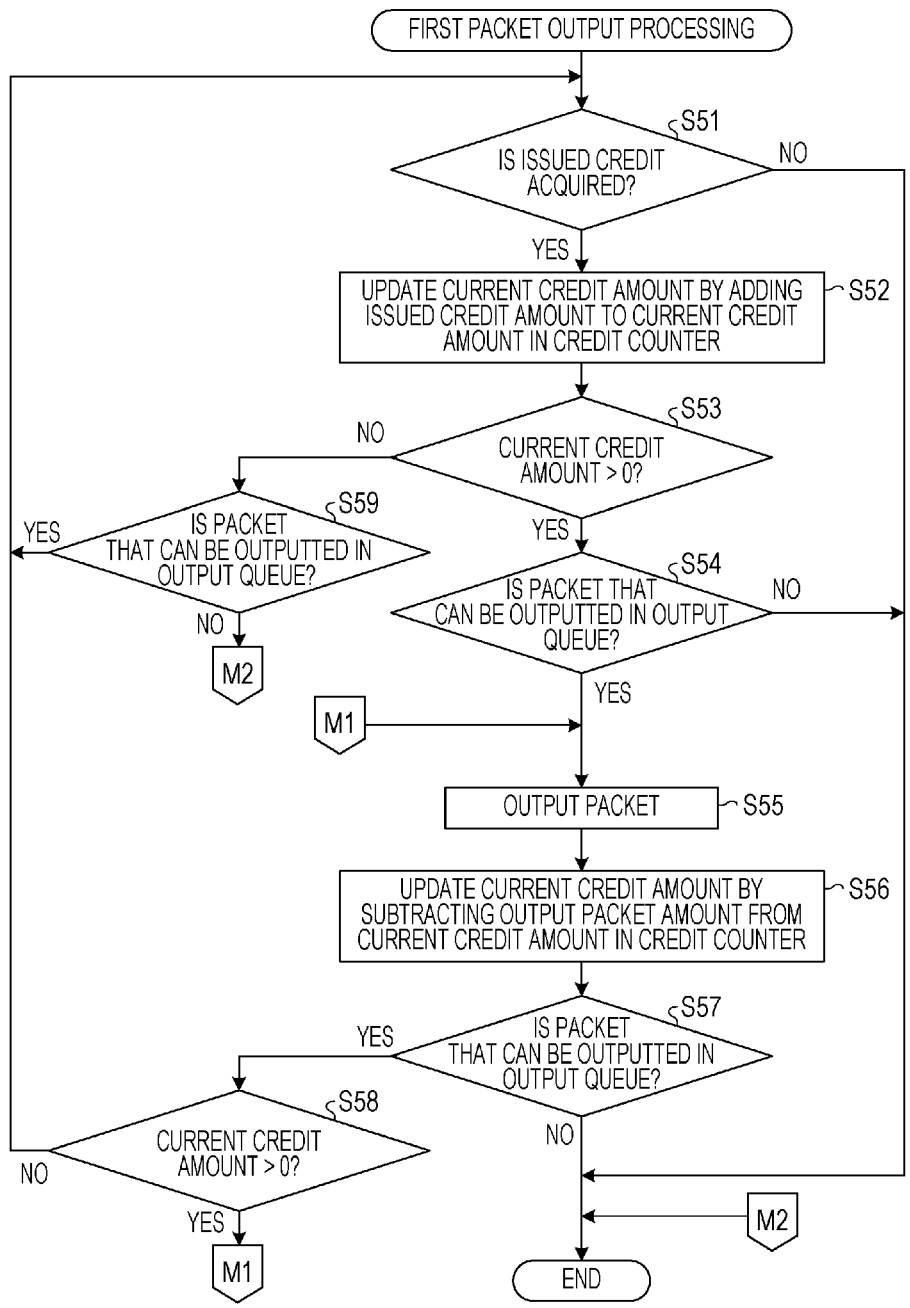

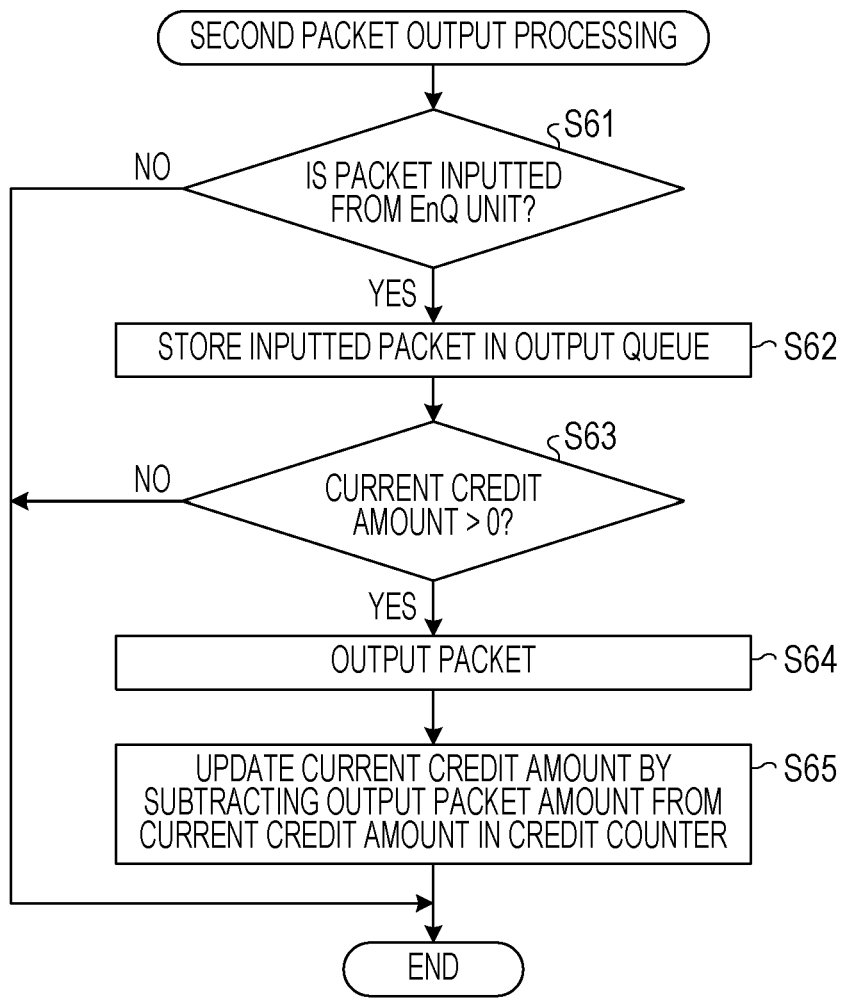

TRANSMISSION APPARATUS AND TRANSMISSION METHOD

CROSS-REFERENCE TO RELATED APPLICATION

This application is based upon and claims the benefit of priority of the prior Japanese Patent Application No. 2013-230663, filed on Nov. 6, 2013, the entire contents of which are incorporated herein by reference.

FIELD

The embodiments discussed herein are related to a transmission apparatus and a transmission method.

BACKGROUND

In transmission systems, the number of users served by a station and an amount of data communicated have been increasing recently along with widespread utilization of smartphones and the like and diversification of services using the Internet, for example. A transmission apparatus to be used in a transmission system simultaneously processes various kinds of data such as voice data whose delay is not acceptable and mail data whose delay is acceptable to some extent. Accordingly, the transmission apparatus identifies priorities of data according to data types and executes data processing according to the priorities.

For example, the transmission apparatus realizes high-speed scheduling with queue selection while accommodating many users and identifying data priorities of variable length packets. As such a high-speed scheduling method, a per-packet round robin (RR) scheme, for example, is employed.

However, in a per-packet queue selection method such as the RR scheme, if a queue selection time is longer than a packet processing time, a time gap occurs between packets outputted from a selected queue. This causes deterioration in packet transmission performances for efficiently transmitting packets. Accordingly, the per-packet queue selection method adopts a mechanism to select a queue within a processing time for the shortest packet among multiple packets.

Japanese Laid-open Patent Publication No. 2002-300577, Japanese Laid-open Patent Publication No. 11-298523, and Japanese Laid-open Patent Publication No. 2009-135810 are examples of the related art.

SUMMARY

According to an aspect of the invention, a transmission apparatus includes: a buffer provided with a queue for each of user flows, the buffer configured to store data in the queue for the user flow to which the data belongs; a storage unit configured to store a link list indicating an output order of the user flows; an issuing unit configured to issue a predetermined output permissible amount to the queue for the user flow by referring to the link list; and an output control unit configured to output data from the queue to which the output permissible amount is issued.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an exemplary relationship between 150 MHz clocks and an issued credit amount in a bandwidth of 100 Gbps;

FIG. 16 is a flowchart illustrating an exemplary processing operation for first packet output processing by an output control unit;

FIG. 17 is a flowchart illustrating an exemplary processing operation for second packet output processing by the output control unit;

DESCRIPTION OF EMBODIMENTS

In a per-packet queue selection scheme such as a RR scheme, as the number of user flows which are data flows from users to other users increases, a processing load for selecting a queue becomes larger and it takes a longer time to select a queue. As a result, a time for selecting a queue becomes longer than a time for processing a packet, so that a time gap occurs between packets. This causes deterioration in packet transmission performances.

Furthermore, in the per-packet queue selection scheme, as a transmission rate becomes faster and a bandwidth thereof also becomes wider, an amount of data processed per unit time becomes larger but a processing time per packet becomes shorter. Accordingly, to avoid the deterioration of the packet transmission performances, it is desirable that the processing time for selecting a queue be shortened as the processing time per packet is shortened.

In the per-packet queue selection scheme, a queue is selected within a processing time equivalent to 8 clocks at 150 MHz in order to realize a bandwidth of 10 Gbps, for example. Also, for example, to realize a bandwidth of 40 Gbps, a queue is selected within a processing time equivalent to 2 clocks at 150 MHz. Furthermore, for example, to realize a bandwidth of 100 Gbps, a queue is selected within a processing time equivalent to one clock at 150 MHz. In short, a processing time for selecting a queue becomes shorter as the bandwidth becomes wider in the per-packet queue selection scheme. Thus, there is limitation on per-packet high-speed scheduling. Therefore, this actually causes the deterioration in the packet transmission performances as the bandwidth becomes wider.

Hereinafter, embodiments of a transmission apparatus and a transmission method for avoiding the deterioration in the packet transmission performances are described in detail. It is noted, however, that the embodiments are not intended to limit the disclosed technology.

Figure 1:
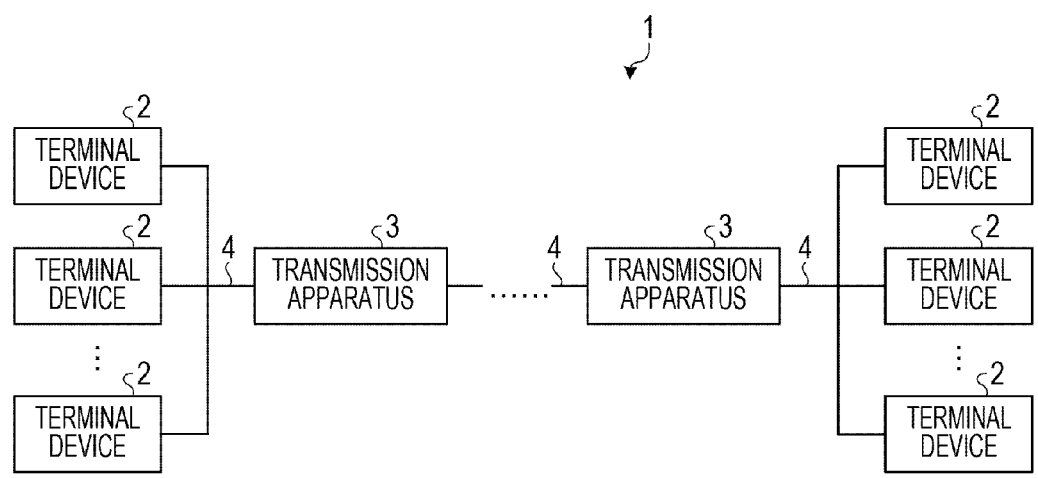
FIG. 1 is a diagram illustrating an exemplary transmission system according to the present embodiment.

FIG. 1 is a diagram illustrating an exemplary transmission system according to the present embodiment. A transmission system 1 illustrated in FIG. 1 includes a plurality of terminal devices 2 and a plurality of transmission apparatuses 3. It is assumed that a terminal device 2 and a transmission apparatus 3 or transmission apparatuses 3 are connected with each other through physical lines such as optical fibers 4. The terminal device 2 is a communication terminal device such as a personal computer. The terminal device 2 may also be a radio terminal such as a smartphone, a tablet terminal, or a mobile telephone. The transmission apparatus 3 is a transmission apparatus configured to transmit packets including various kinds of data such as voice data and mail data which are collected from the terminal device 2 to another transmission apparatus 3 or other terminal devices 2. It is noted that the transmission apparatus 3 may be a base station or the like which is configured to accommodate radio terminals through radio connection when the terminal device 2 is a radio terminal.

Figure 2:
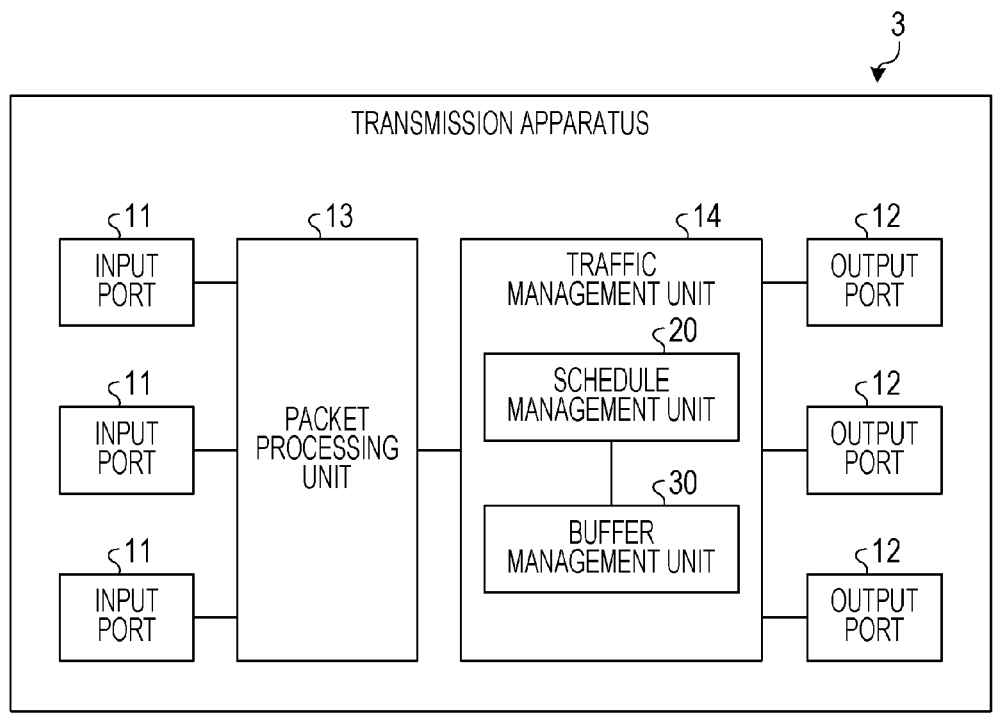
FIG. 2 is a block diagram illustrating an exemplary transmission apparatus.

FIG. 2 is a block diagram illustrating an example of the transmission apparatus 3. The transmission apparatus 3 in FIG. 2 has a plurality of input ports 11, a plurality of output ports 12, a packet processing unit 13, and a traffic management unit 14. The input port 11 is an input interface which is physically connected with an optical fiber 4 and has a photoelectric conversion function to convert an inputted optical signal from the optical fiber 4 into per packet bit string. The output port 12 is an output interface which is physically connected with the optical fiber 4 and has a photoelectric conversion function to convert the per packet bit string into an optical signal and to output the converted optical signal to the optical fiber 4. The packet processing unit 13 is realized as a network processing unit (NPU) or the like, which is configured to analyze header information in a packet in the bit string and to execute various kinds of packet processing such as transmission path selection and packet discarding determination based on the analyzed result.

The traffic management unit 14 has a buffering function, a priority control function, a bandwidth control function, an output queue selection function, and the like. The buffering function is a function to identify a user flow by a flow ID which is included in packet information of the input packet and to provide an output queue in the buffer for each user flow to which the input packet belongs and then to store the input packet in the output queue. It is noted that the user flow means here, for example, a flow of data from a specific user to other specific user. The priority control function is a function to determine timing of outputting a packet according to a priority of the user flow. It is noted that the priority means here, for example, an output priority of the user flow in accordance with data class information, a token state, and the like. The bandwidth control function is a function to manage a bandwidth for each user flow by using a method such as a token bucket method or a leaky bucket method. The output queue selection function is a function to select an output queue among the multiple output queues and to output a packet in the selected output queue from the output port 12. It is noted that the traffic management unit 14 is realized as an application specific integrated circuit (ASIC), a field-programmable gate array (FPGA), or the like.

The traffic management unit 14 has a schedule management unit 20 and a buffer management unit 30. The buffer management unit 30 is configured to manage, for example, the buffering function in which an output queue is provided in a buffer for each user flow to which the input packet belongs and the input packet is stored in the output queue for the user flow. The schedule management unit 20 is configured to manage a function to determine the corresponding output queue among the multiple output queues efficiently and at a high speed, such as a priority control function, a bandwidth control function, an output queue selection function, or the like.

Figure 3:
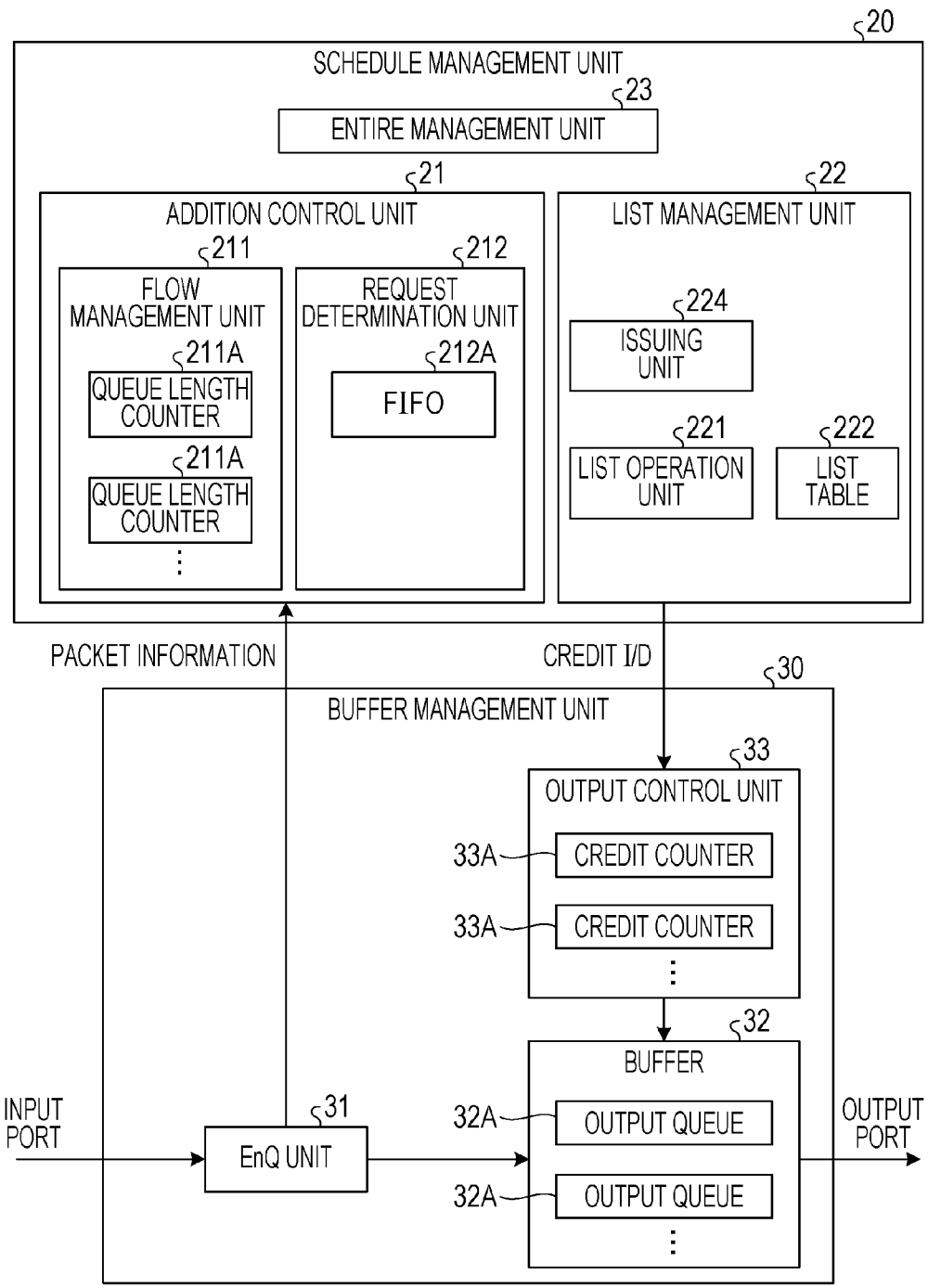
FIG. 3 is a block diagram illustrating an exemplary schedule management unit and an exemplary buffer management unit.

FIG. 3 is a block diagram illustrating examples of the schedule management unit 20 and the buffer management unit 30. The buffer management unit 30 in FIG. 3 has an EnQ unit 31, a buffer 32, and an output control unit 33. The EnQ unit 31 inputs packets through the input port 11. If an input packet from the EnQ unit 31 is detected, the buffer 32 stores the input packet in an output queue 32A for a user flow to which the input packet belongs. It is noted that the buffer 32 provides an output queue 32A for a new user flow if an input packet belonging to a new user flow is detected. In other words, the buffer 32 has the output queue 32A for each user flow. Furthermore, if an input packet is detected, the EnQ unit 31 notifies the schedule management unit 20 of an input packet length of the input packet and a flow number to identify a user flow of the input packet as packet information.

The output control unit 33 selects an output queue 32A per user flow among the multiple output queues 32A and outputs packets in the selected output queue 32A per packet. Also, the output control unit 33 includes a credit counter 33A configured to count a credit amount that can be outputted from the output queue 32A for each output queue 32A in which the packets belonging to the user flow are stored. The credit amount is at least an output permissible amount such as data amount to which a time longer than a processing time for selecting the output queue 32A is converted. The credit counter 33A is, for example, a calculation unit configured to update a current credit amount by subtracting an output packet length from the current credit amount when the packet in the output queue 32A is outputted. The credit counter 33A updates the current credit amount by adding an issued credit amount which is issued by the schedule management unit 20 to the current credit amount.

The schedule management unit 20 has an addition control unit 21, a list management unit 22, and an entire management unit 23. The addition control unit 21 is configured to acquire an entry 41 configuring the link list 40 illustrated in FIG. 5 based on the packet information of the input packet obtained from the EnQ unit 31. The link list 40 indicates an array indicating an order of outputting a user flow that is identified by the flow number. In the link list 40, the entries 41, each identifying a flow number, are arrayed in an order to be outputted and tied in a row. The entire management unit 23 manages the addition control unit 21 and the list management unit 22.

The addition control unit 21 has a flow management unit 211 and a request determination unit 212. The flow management unit 211 is provided with a queue length counter 211A configured to manage a current queue length for each user flow. The queue length counter 211A is, for example, a queue length calculation unit configured to update a current queue length for each user flow by subtracting the issued credit amount from the current queue length. The flow management unit 211 determines whether the current queue length of the queue length counter 211A is positive (a plus value) by referring to the current queue length of the queue length counter 211A for each user flow.

The request determination unit 212 is configured to determine whether there is a list operation request relating to the entry of the input packet according to a first timing so as to secure processing time for the list operation to be executed by the list management unit 22. For example, the first timing means such timing that an additional event to the link list 40 is generated when the output queue 32A for each user flow shifts to a state capable of outputting a packet in the packet input or the token adding processing. Also, the first timing means such timing that an addition event to the link list 40 is generated when the credit has been issued. The list operation request is a command to request the list operation to add the entry 41 of the flow number to the link list 40, from the list management unit 22 to the addition control unit 21.

The request determination unit 212 has a temporary storage unit such as an FIFO 212A inside an unillustrated storage region. It is noted that the shortest time period of timing when a list operation request is generated from an arbitrary user flow is a processing time for the shortest packet. However, when a short packet whose user flow is different is inputted in a short interval, a list operation request relating to the entry 41 of the packet is generated at the processing time for the shortest packet for each user flow. Then, the request determination unit 212 temporarily stores the entry 41 relating to the list operation request in the FIFO 212A because the list operation request is issued to the list management unit 22 in a time shorter than the time in which processing is possible by the list management unit 22. As a result, the request determination unit 212 can secure a processing time for executing the list operation of the link list 40 for each user flow because the list operation request is notified to the list management unit 22 at the timing capable of being processed by the list management unit 22.

The request determination unit 212 acquires an entry of a target user flow when the link list 40 is operated in a case where the current queue length is positive and the bandwidth is in a normal state at the timing of inputting the packet belonging to the target user flow. Also, the request determination unit 212 acquires an entry of a target user flow when the link list 40 is operated in a case where the current queue length is positive and the bandwidth is in the normal state at the timing of updating the bandwidth of the target user flow. Furthermore, the request determination unit 212 acquires an entry of a target user flow when the link list 40 is operated in a case where the current queue length is positive and the bandwidth is in the normal state at the timing when a credit has been issued to the credit counter 33A for the target user flow.

The request determination unit 212 is, for example, a determination unit configured to determine whether an entry matching with the acquired entry 41 of the target user flow exists in the FIFO 212A. When the matched entry 41 exists in the FIFO 212A, the request determination unit 212 does not allow the entry 41 to be stored in the FIFO 212A. In addition, when the matched entry 41 does not exist in the FIFO 212A, the request determination unit 212 stores the entry 41 in the FIFO 212A. Consequently, the request determination unit 212 realizes one entry/one flow by avoiding duplicated registration of the matched entry 41 relating to the link list 40 in the FIFO 212A.

When a second timing is detected, the request determination unit 212 inserts the head entry 41 stored in the FIFO 212A into a proper position in the link list 40. It is noted that the second timing means such timing when the entry 41 exists in the FIFO 212A and processing is possible in the list management unit 22.

The request determination unit 212 determines whether the entry 41 exists in the FIFO 212A. When the entry 41 exits in the FIFO 212A, the request determination unit 212 reads out a head entry 41 stored in the FIFO 212A. When the head entry 41 is read out, the request determination unit 212 refers to the latest state of the queue length counter 211A for the target user flow. The request determination unit 212 requests the list operation relating to the entry 41 of the link list 40. Furthermore, the request determination unit 212 deletes the head entry 41 in the FIFO 212A after the list operation request has been notified.

When the entry 41 does not exist in the FIFO 212A, the request determination unit 212 terminates the processing without issuing the list operation request. Even when the entry 41 exists in the FIFO 212A, the request determination unit 212 also terminates the processing without issuing the list operation request in a state where the head entry 41 is left in the FIFO 212A when the processing is not possible in the list management unit 22.

The list management unit 22 has a list operation unit 221, a list table 222, and an issuing unit 224. The list operation unit 221 is, for example, an execution unit configured to execute a list operation for inserting the entry 41 of the list operation request from the request determination unit 212 into a predetermined position of the link list 40. The list operation unit 221 stores the link list 40 such as a storage unit in which the list operation is executed in the list table 222.

Figure 4:
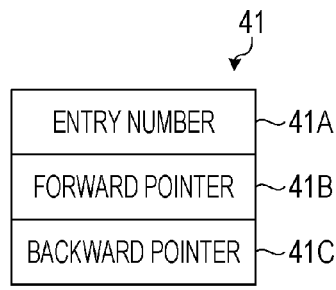
FIG. 4 is a diagram illustrating an exemplary link list entry configuration.

FIG. 4 is a diagram illustrating an exemplary entry configuration of the link list 40. The entry 41 in the link list 40 in FIG. 4 has an entry number 41A, a forward pointer 41B, and a backward pointer 41C. The entry number 41A is a number to identify a flow number's entry 41 of the target user flow in the link list 40. The forward pointer 41B is an entry number to identify a flow number's entry 41 of a user flow forwardly adjacent to the target user flow. The backward pointer 41C is an entry number to identify a flow number's entry of a user flow backwardly adjacent to the target user flow. The entry number 41A may be an element number of a software array, for example. The link list 40 manages the bidirectional forward pointer 41B and backward pointer 41C for each entry number 41A. Thus, an entry 41A is easily added, deleted, or erased.

Figure 5:
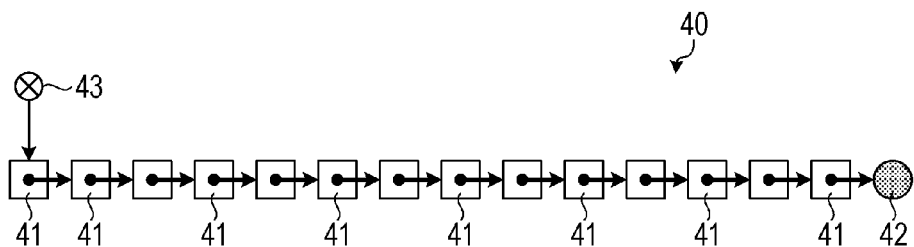
FIG. 5 is a diagram illustrating an exemplary link list.

FIG. 5 is a diagram illustrating an example of the link list 40. The link list 40 in FIG. 5 indicates a bidirectional array that includes entries 41, a front (head) 42, and an end (tail) 43, and the entries 41 of a user flow are arrayed in an output order from the head 42 to the tail 43. The list management unit 22 refers to the link list 40 stored in the list table 222 and follows the entries 41 in the link list 40 from the head 42 to the tail 43, so that the output order of the target user flow can be identified. Also, the list management unit 22 refers to the link list 40 and follows the entries 41 in the link list 40 from the tail 43 to the head 42, so that a reverse path of the output order of the user flow can be identified.

Figure 6:
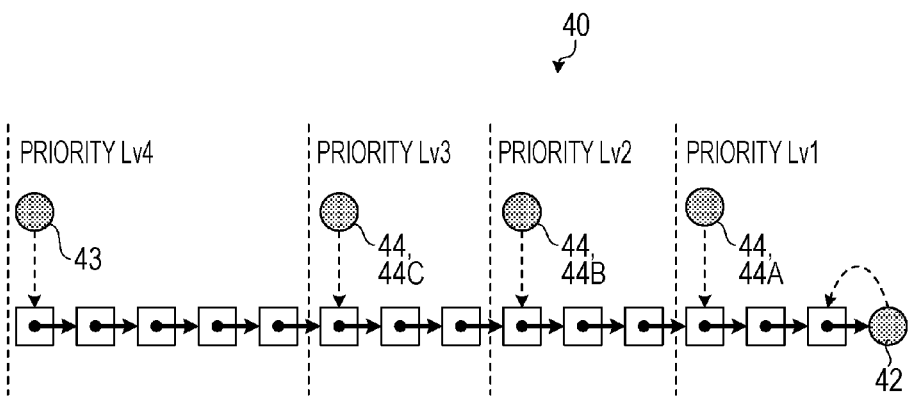
FIG. 6 is a diagram illustrating an exemplary link list with priority setting.

FIG. 6 is a diagram illustrating an example of a link list 40 with priority setting. In the link list 40 in FIG. 6, boundary entries 44 can be designated from among the entries 40 from the head 42 to the tail 43, and priorities are set to the boundaries 44, the head 42, or the tail 43. For example, the list operation unit 221 designates a first boundary 44A and sets a first priority Lv1 to each entry 41 in a section between the entry 41 of the head 42 and the entry 41 of the first boundary 44A. Similarly, the list operation unit 221 designates a second boundary 44B and sets a second priority Lv2 to each entry 41 in a section between the entry 41 just after the entry 41 of the first boundary 44A and the entry 41 of the second boundary 44B.

Similarly, the list operation unit 221 designates a third boundary 44C and sets a third priority Lv3 to each entry 41 in a section between the entry 41 just after the entry 41 of the second boundary 44B and the entry 41 of the third entry 44C. Also, the list operation unit 221 sets a fourth priority Lv4 to each entry 41 in a section between the entry 41 just after the entry 41 of the third boundary 44C and the tail 43. It is noted that the first priority Lv1 has the highest priority order and the priority order following the first priority Lv1 is higher in the order of the second priority Lv2, the third priority Lv3, and the fourth priority Lv4. Accordingly, the list operation unit 221 is capable of easily setting a boundary 44 to any entry 41 in the link list 40.

The issuing unit 224 of the list management unit 22 regularly refers to the head entry 41 in the link list 40. When the head entry 41 exists, the issuing unit 224 issues a credit with a fixed length to the credit counter 33A for the user flow of the head entry 41. As a result, the queue length counter 211A updates a current queue length by subtracting an issued credit length from the current queue length. In addition, the credit counter 33A updates the current credit amount by adding the issued credit amount to the current credit amount. It is assumed that the issued credit amount be, for example, a fixed length of 1024 bytes, which is a data amount to which a time at least longer than a processing time for selecting a next output queue 32A is converted. FIG. 7 is a diagram illustrating an exemplary relationship between 150 MHz clocks and an issued credit amount in a bandwidth of 100 Gbps. For example, the issued credit amount is a data amount equivalent to a time for 8 clocks at 150 MHz. Specifically, if a conventional RR scheme is used in the bandwidth of 100 Gbps as a comparative example as illustrated on the upper side of FIG. 7, a processing time for selecting an output queue has to be secured within the time for one clock at 150 MHz. Thus, it becomes more difficult to secure the processing time as the bandwidth becomes wider. On the other hand, in the present embodiment, as illustrated on the lower side of FIG. 7, an output queue 32A only has to be selected within a time equivalent to 8 clocks (a credit amount) at 150 MHz. Thus, even when the bandwidth becomes wider, a processing time for selecting the output 32A is secured.

Each of the schedule management unit 20 and the buffer management unit 30 includes an output queue 32A, a credit counter 33A, and a queue length counter 211A for each user flow.

Hereinafter, an operation of the transmission system 1 according to the embodiment is described. FIGS. 8A to 9D are diagrams illustrating an exemplary short packet output operation of the schedule management unit 20 and the buffer management unit 30. It is assumed in the transmission apparatus 3 in FIG. 8A that a packet length (queue length) stored in the output queue 32A for the target user flow in the buffer 32 be "0 byte" and a current queue length of the queue length counter 211A for the target user flow be "0 byte." Furthermore, it is assumed in the transmission apparatus 3 that a current credit amount of the credit counter 33A for the target user flow is "0 byte."

Figure 8A:
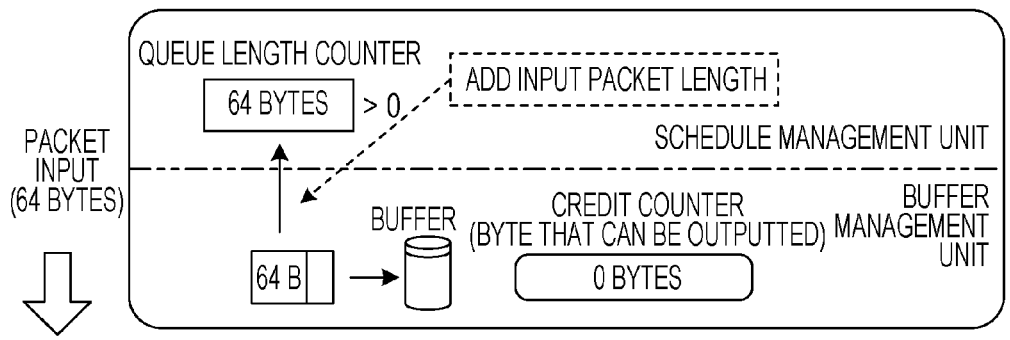
FIGS. 8A to 8D are diagrams illustrating an exemplary short packet output operation of the schedule management unit and the buffer management unit.

As illustrated in FIG. 8A, the EnQ unit 31 in the buffer management unit 30 stores an input packet of 64 bytes in the output queue 32A for the target user flow to which the input packet belongs when the packet of 64 bytes is inputted. The EnQ unit 31 notifies the schedule management unit 20 of the packet information relating to the packet of 64 bytes. It is noted that the packet information includes the packet length of the input packet, the flow number of the user flow to which the input packet belongs, and the like.

Figure 8B:
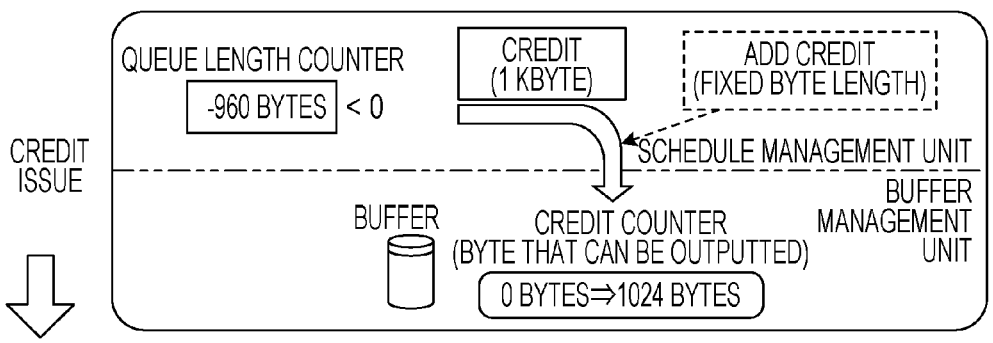

The queue length counter 211A for the target user flow inside the schedule management unit 20 updates a current queue length as "64 bytes" by adding the input packet length of "64 bytes" to the current queue length "0 byte." The issuing unit 224 in the schedule management unit 20 regularly refers to the head entry 41 in the link list 40 to determine whether the head entry 41 of the target user flow exists. As illustrated in FIG. 8B, when the head entry 41 of the target user flow exists, the issuing unit 224 issues an issued credit of "1K bytes (1024 bytes)" to the credit counter 33A of the output queue 32A for the user flow of the head entry 41. The credit counter 33A updates the current credit amount as "1024 bytes" by adding the issued credit amount of "1024 bytes" to the current credit amount of "0 byte." The queue length counter 211A updates the current queue length as "−960 bytes" by subtracting the issued credit amount of "1024 bytes" from the current queue length of "64 bytes."

Figure 8C:
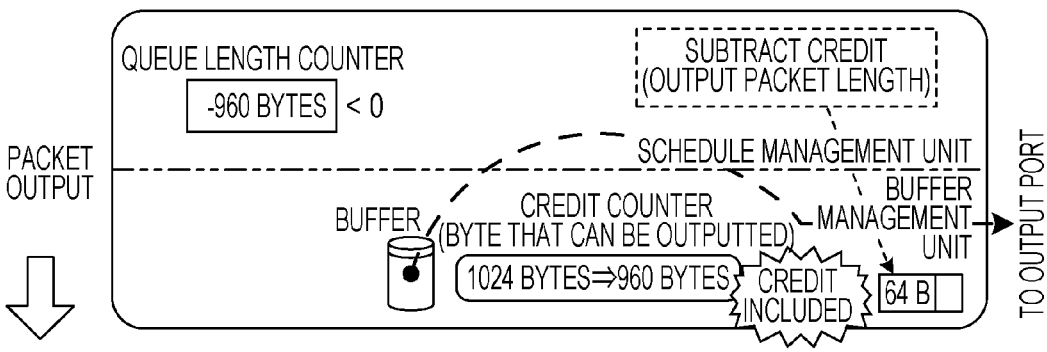

The output control unit 33 of the buffer management unit 30 determines whether the current credit amount of "1024 bytes" inside the credit counter 33A for the target user flow is positive. As illustrated in FIG. 8C, when the current credit amount is positive, the output control unit 33A outputs a 64-byte packet stored in the output queue 32A for the target user flow. After that, the credit counter 33A for the target user flow updates the current credit amount as "960 bytes" by subtracting the output packet length of "64 bytes" from the current credit amount of "1024 bytes."

Figure 8D:
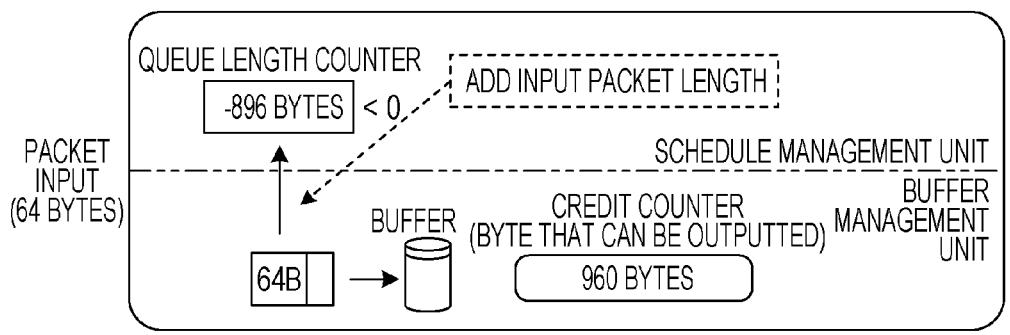

Furthermore, as illustrated in FIG. 8D, when a 64-byte packet is inputted, the EnQ unit 31 stores the input packet of 64 bytes in the output queue 32A for the target user flow. After that, the EnQ unit 31 notifies the schedule management unit 20 of the packet information relating to the storage of the 64-byte packet. The queue length counter 211A for the target user flow updates the current queue length of "−896 bytes" by adding the input packet length of "64 bytes" to the current queue length of "−960 bytes".

Figure 9A:
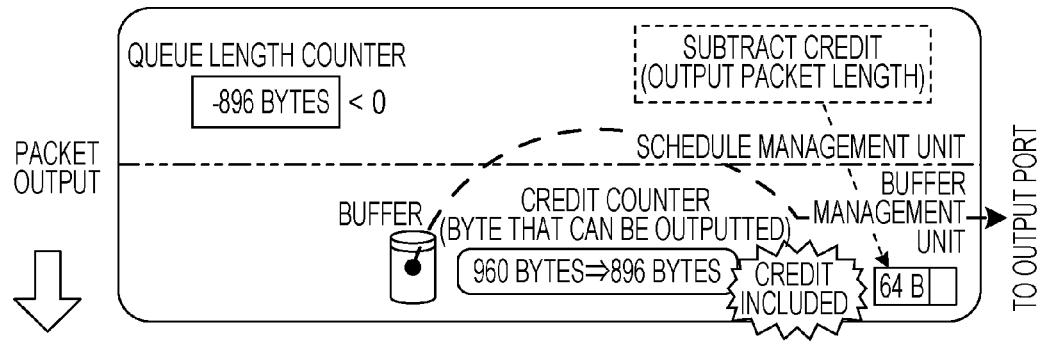
FIGS. 9A to 9D are diagrams illustrating the exemplary short packet operation of the schedule management unit and the buffer management unit.

Furthermore, the output control unit 33 determines whether the current credit amount of "960 bytes" inside the credit counter 33A for the target user flow is positive. As illustrated in FIG. 9A, when the current credit amount is positive, the output control unit 33 selects the output queue 32A for the target user flow and outputs the 64-byte packet stored in the output queue 33A. Then, the credit counter 33A for the target user flow updates the current credit amount as "896 bytes" by subtracting the output packet length of "64 bytes" from the current credit amount of "960 bytes".

Figure 9B:
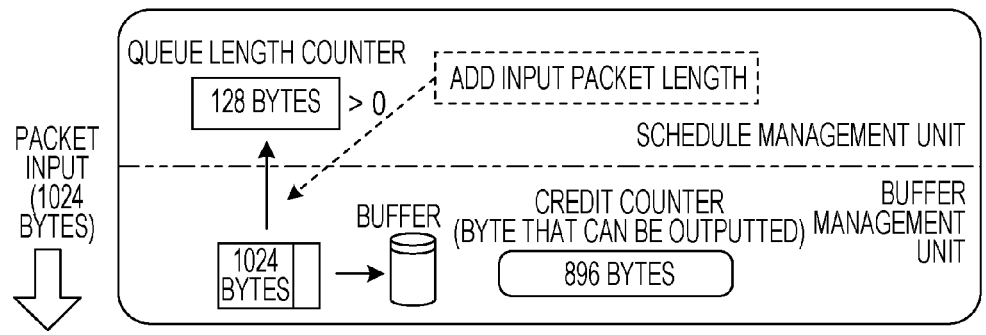

Furthermore, as illustrated in FIG. 9B, when the 1024-byte packet is inputted, the EnQ unit 31 stores the input packet in the output queue 32A for the target user flow. After that, the EnQ unit 31 notifies the schedule management unit 20 of the packet information relating to the storage of the 1024-byte packet. The queue length counter 211A for the target user flow updates the current queue length as "128 bytes" by adding the input packet length of "1024 bytes" to the current queue length of "−896 bytes".

Figure 9C:
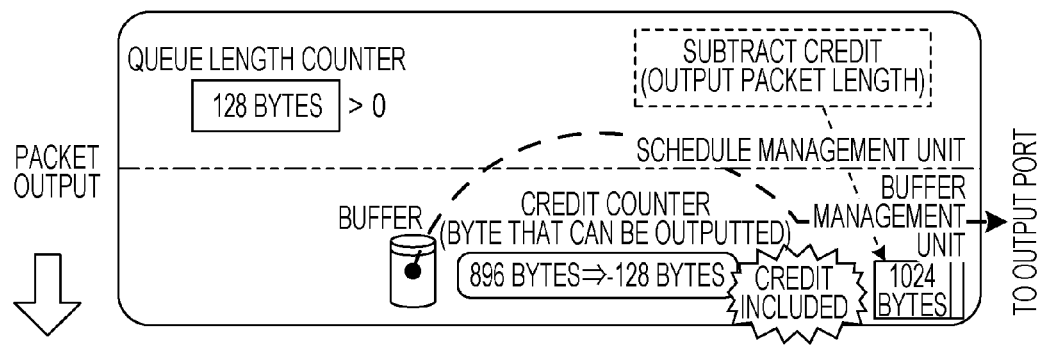

Furthermore, the output control unit 33 determines whether the current credit amount of "896 bytes" in the credit counter 33A for the target user flow is positive. As illustrated in FIG. 9C, when the current credit amount of "896 bytes" is positive, the output control unit 33 outputs the 1024-byte packet stored in the output queue 32A for the target user flow. Then, the credit counter 33A for the target user flow updates the current credit amount as "−128 bytes" by subtracting the output packet length of "1024 bytes" from the current credit amount of "896 bytes."

Figure 9D:
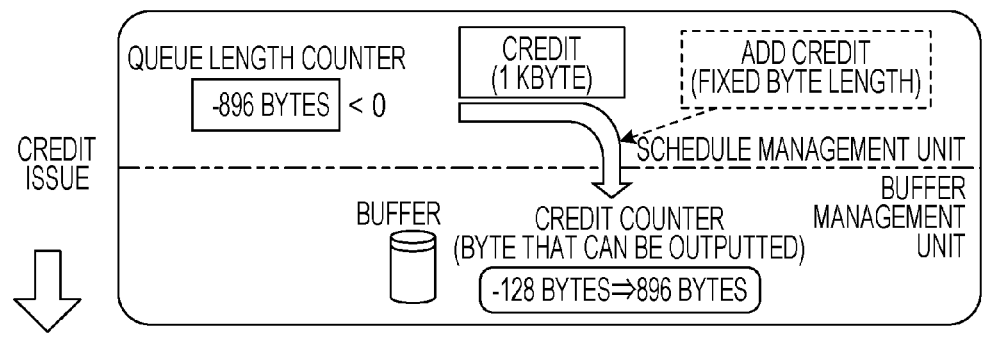

Furthermore, the issuing unit 224 regularly refers to the head entry 41 in the link list 40 to determine whether the head entry 41 of the target user flow exists. As illustrated in FIG. 9D, when the head entry 41 of the target user flow exists, the issuing unit 224 issues the issue credit to the credit counter 33A of the output queue 32A of the target user flow of the head entry 41. The credit counter 33A for the target user flow updates the current credit amount as "896 bytes" by adding the issued credit amount of "1024 bytes" to the current credit amount of "−128 bytes". Furthermore, the queue length counter 211A for the user flow updates the current queue length as "−896 bytes" by subtracting the issued credit amount of "1024 bytes" from the current queue length of "128 bytes".

The transmission apparatus 3 outputs the packets in the output queue 32A in a unit of packet when a packet that can be outputted exists in the output queue 32A for the target user flow and the current credit amount in the credit counter 33A for the target user flow is positive. Furthermore, the transmission apparatus 3 sequentially outputs the packets per in a unit of packet when a packet that can be outputted exists in the output queue 32A for the target user flow. As a result, the transmission apparatus 3 is capable of sequentially outputting the short packet in the output queue 32A in a unit of packet until the current credit amount becomes 0.

The transmission apparatus 3 regularly refers to the link list 40 and issues a fix-length credit to the credit counter 33A for the user flow of the head entry 41. As a result, the output queue 32A for the target user flow to which the credit is issued becomes a state where a packet is that can be outputted.

FIGS. 10A to 11D are diagrams illustrating an exemplary long packet output operation of the schedule management unit 20 and the buffer management 30. It is assumed in the transmission apparatus 3 in FIG. 10A that a packet length stored in the output queue 32A for the target user flow in the buffer 32 be "0 byte" and a current queue length of the queue length counter 211A for the target user flow be "0 byte". Furthermore, it is assumed in the transmission apparatus 3 that a current credit amount of the credit counter 33A for the target user flow is "0 byte".

Figure 10A:
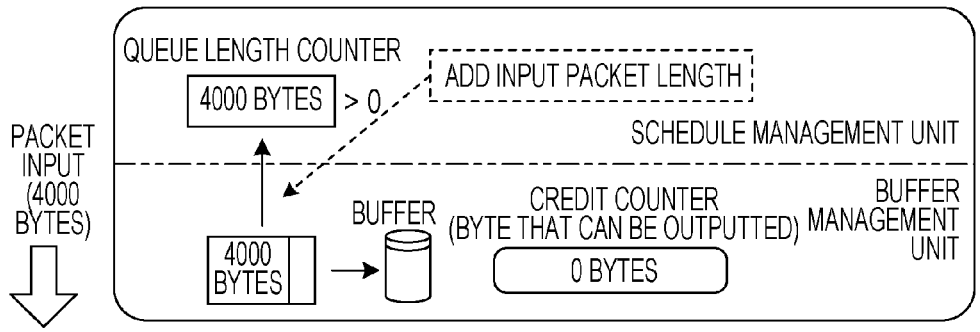
FIGS. 10A to 10D are diagrams illustrating an exemplary long packet output operation of the schedule management unit and the buffer management unit.

As illustrated in FIG. 10A, the EnQ unit 31 stores an input packet in the output queue 32A for the target user flow when a packet of "4000" bytes is inputted. Then the EnQ unit 31 notifies the schedule management unit 20 of the packet information relating to the storage of the 4000-byte packet. The queue length counter 211A for the target user flow updates the current queue length as "4000 bytes" by adding the input packet length of "4000 bytes" to the current queue length of "0 byte".

Figure 10B:
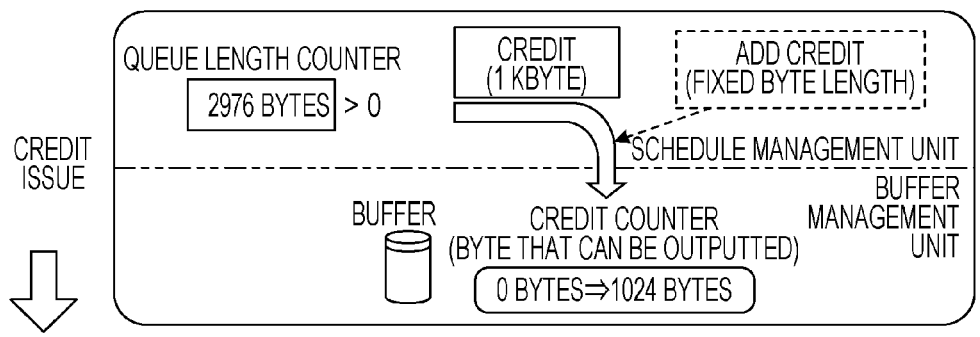

The issuing unit 224 regularly refers to the head entry 41 in the link list 40 to determine whether the head entry 41 of the target user flow exists. As illustrated in FIG. 10B, when the head entry 41 of the target user flow exists, the issuing unit 224 issues an issued credit of "1024 bytes" to the credit counter 33A for the target user flow of the head entry 41. The credit counter 33A updates the current credit amount as "1024 bytes" by adding the issued credit amount of "1024 bytes" to the current credit amount of "0 byte". Furthermore, the queue length counter 211A for the target user flow updates the current queue length as "2976 bytes" by subtracting the issued credit amount of "1024 bytes" from the current queue length of "4000 bytes".

Figure 10C:
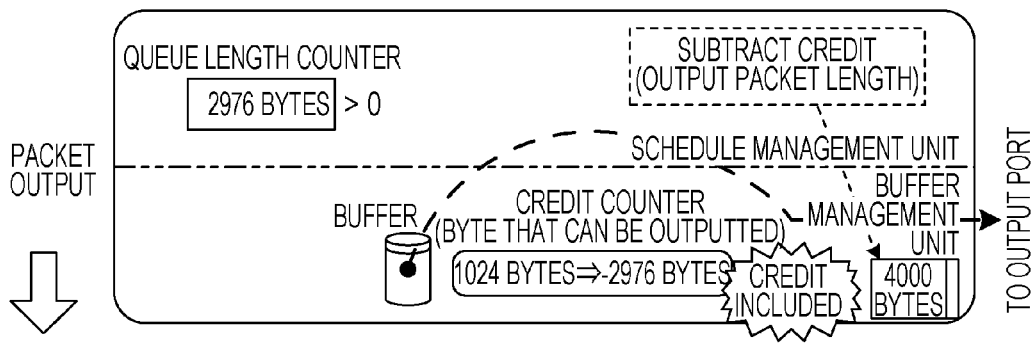

The output control unit 33 determines whether the current credit amount of "1024 bytes" in the credit counter 33A for the target user flow is positive. As illustrated in FIG. 10C, when the current credit amount of "1024 bytes" is positive, the output control unit 33 outputs a 4000-byte packet stored in the output queue 32A for the target user flow. After that, the credit counter 33A for the target user flow updates the current credit amount as "−2976 bytes" by subtracting the output packet length of "4000 bytes" from the current credit amount of "1024 bytes".

Figure 10D:
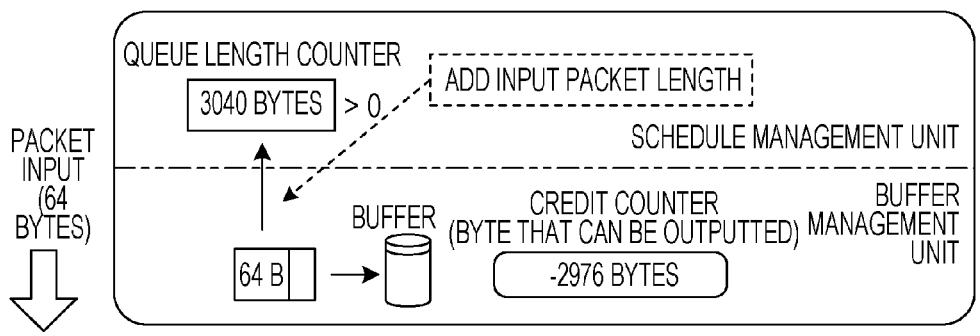

Furthermore, as illustrated in FIG. 10D, when a 64-byte packet is inputted, the EnQ unit 31 stores the input packet in the output queue 32A for the target user flow. After that, the EnQ unit 31 notifies the schedule management unit 20 of the packet information relating to the storage of the 64-byte packet. The queue length counter 211A for the target user flow updates the current queue length as "3040 bytes" by adding the input packet length of "64 bytes" to the current queue length of "2976 bytes".

Figure 11A:
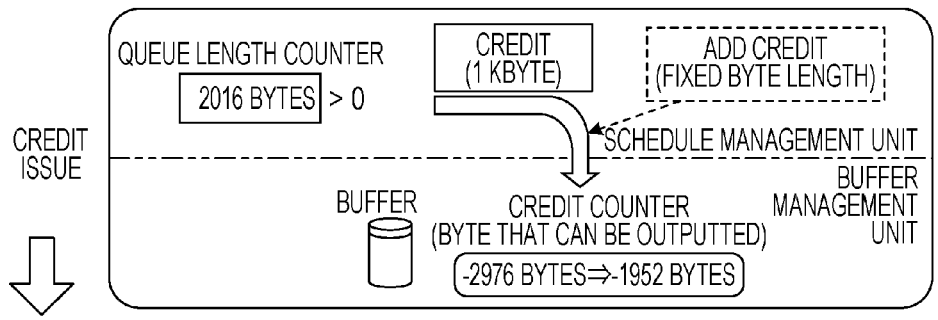
FIGS. 11A to 11D are diagrams illustrating the exemplary long packet output operation of the schedule management unit and the buffer management unit.

The issuing unit 224 regularly refers to the head entry 41 in the link list 40 to determine whether the head entry 41 of the target user flow exists. As illustrated in FIG. 11A, when the head entry 41 of the target user flow exists, the issuing unit 224 issues an issued credit of "1024 bytes" to the credit counter 33A of the output queue 32A for the target user flow of the head entry 41. The credit counter 33A updates the current credit amount as "−1952 bytes" by adding the issued credit amount of "1024 bytes" to the current credit amount of "−2976 byte". Furthermore, the queue length counter 211A for the target user flow updates the current queue length as "2016 bytes" by subtracting the issued credit amount of "1024 bytes" from the current queue length of "3040 bytes".

Figure 11B:
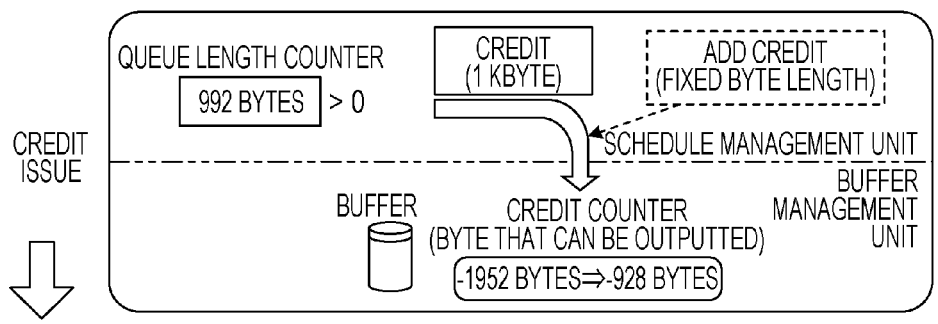

The issuing unit 224 regularly refers to the head entry 41 in the link list 40 to determine whether the head entry 41 of the target user flow exists. As illustrated in FIG. 11B, when the head entry 41 of the target user flow exists, the issuing unit 224 issues an issued credit of "1024 bytes" to the credit counter 33A of the output queue 32A for the target user flow of the head entry 41. The credit counter 33A updates the current credit amount as "−928 bytes" by adding the issued credit amount of "1024 bytes" to the current credit amount of "−1952 bytes". Furthermore, the queue length counter 211A for the target user flow updates the current queue length as "992 bytes" by subtracting the issued credit amount of "1024 bytes" from the current queue length of "2016 bytes".

Figure 11C:
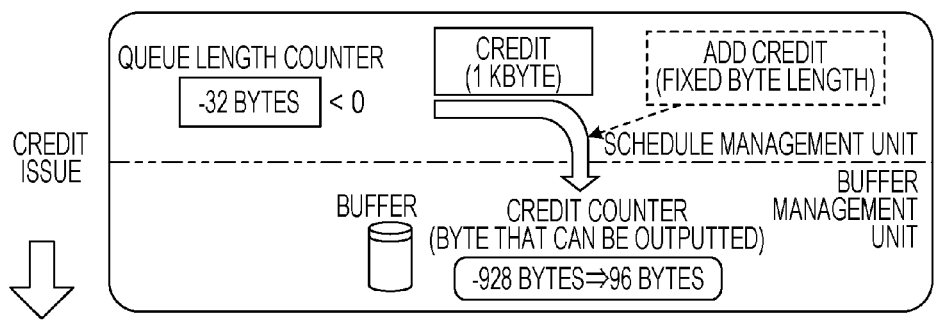

The issuing unit 224 regularly refers to the head entry 41 in the link list 40 to determine whether the head entry 41 of the target user flow exists. As illustrated in FIG. 11C, when the head entry 41 of the target user flow exists, the issuing unit 224 issues an issued credit of "1024 bytes" to the credit counter 33A of the output queue 32A for the target user flow of the head entry 41. The credit counter 33A updates the current credit amount as "96 bytes" by adding the issued credit amount of "1024 bytes" to the current credit amount of "−928 bytes." Furthermore, the queue length counter 211A for the target user flow updates the current queue length as "−32 bytes" by subtracting the issued credit amount of "1024 bytes" from the current queue length of "992 bytes".

Figure 11D:
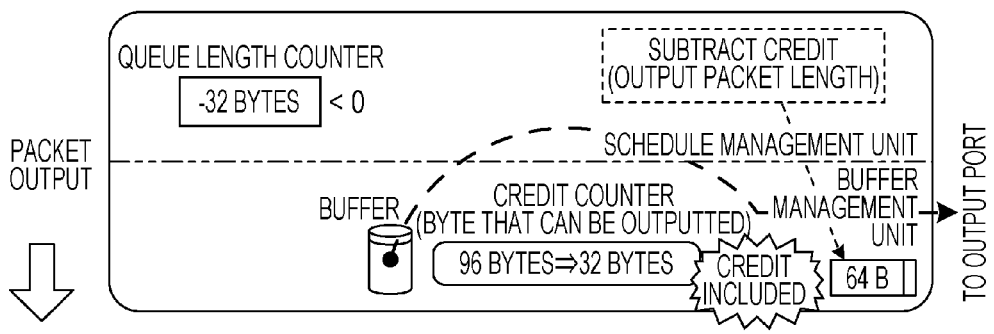

The output control unit 33 determines whether the current credit amount of "96 bytes" in the credit counter 33A for the target user flow is positive. As illustrated in FIG. 11D, when the current credit amount of "96 bytes" is positive, the output control unit 33 outputs a 64-byte packet stored in the output queue 32A for the target user flow. After that, the credit counter 33A for the target user flow updates the current credit amount as "−32 bytes" by subtracting the output packet length of "64 bytes" from the current credit amount of "96 bytes".

The transmission apparatus 3 outputs the long packets in the output queue 32A in a unit of packet when a packet exists in the output queue 32A for the target user flow and the current credit amount is positive even though the packets in the output queue 32A are long packets. As a result, the transmission apparatus 3 is capable of outputting the long packet in the output queue 32A for the target user flow in a unit of packet until the current credit amount of the credit counter 33A becomes positive.

The transmission apparatus 3 updates the current credit amount of the credit counter 33A for the target user flow by subtracting the output packet length from the current credit amount when the packet is outputted from the output queue 32A for the target user flow. The transmission apparatus 3 regularly refers to the link list 40 and issues a fixed-length credit to the credit counter 33A for the target user flow of the head entry 41. The transmission apparatus 3 stops outputting the packet for the target user flow until the current credit amount of the credit counter 33A becomes positive.

Figure 12:
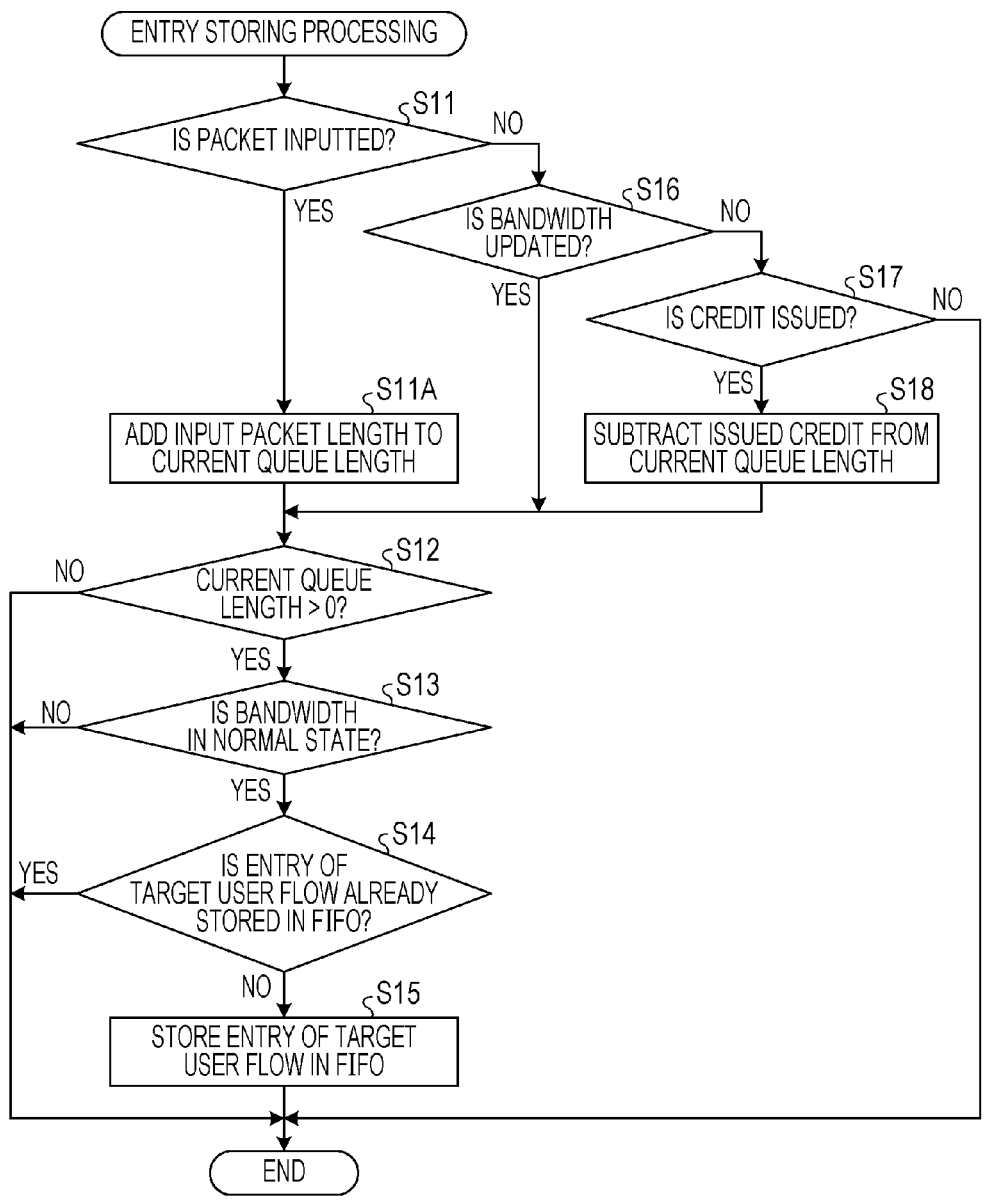
FIG. 12 is a flowchart illustrating an exemplary processing operation for entry storing processing by an addition control unit.

FIG. 12 is a flowchart illustrating an exemplary processing operation for the entry storing processing by the addition control unit 21. The entry processing illustrated in FIG. 12 is to store the entry 41 of a packet of the target user flow in the FIFO 212A according to the first timing.

In FIG. 12, the request determination unit 212 in the addition control unit 21 determines whether a packet is inputted to the target user flow based on the packet information obtained from the EnQ unit 31 (step S11). When the packet is inputted to the target user flow (YES at step S11), the request determination unit 212 adds the input packet length to the current queue length in the queue length counter 211A for the target user flow (step S11A). The request determination unit 212 determines whether the current queue length in the queue length counter 211A for the target user flow is positive (step S12). When the current queue length is positive (YES at step S12), the request determination unit 212 determines whether the bandwidth for the target user flow is in the normal state (step S13). When the bandwidth is in the normal state (YES at step S13), the request determination unit 212 determines whether the entry 41 of the target user flow has already existed in the FIFO 212A (step S14).

When the entry of the target user flow does not exist in the FIFO 212A (NO at step S14), the request determination unit 212 stores the entry 41 of the target user flow in the FIFO 212A (step S15) and terminates the processing operation illustrated in FIG. 12. The request determination unit 212 stores the entry 41 in the FIFO 212A only when the entry 41 of the target user flow does not exist in the FIFO 212A. As a result, the request determination unit 212 avoids redundant registration of the matched entry to the link list 40 in the FIFO 212A, so that one entry/one flow can be realized.

When a packet to the target user flow is not inputted (NO at step S11), the request determination unit 212 determines whether the update of the bandwidth for the target user flow is detected (step S16). It is noted that the update of the bandwidth means, for example, an update of a bandwidth from an abnormal state to the normal state. When the update of the bandwidth is detected (YES at step S16), the request determination unit 212 proceeds to step S12 to determine whether the current queue length of the queue length counter 211A according to the target user flow is positive.

When the update of the bandwidth is not detected (NO at step S16), the request determination unit 212 determines whether the credit has been already issued to the credit counter 33A for the target user flow (step S17). When the credit has been already issued (YES at step S17), the request determination unit 212 subtracts the issued credit amount from the current queue length for the target user flow (step S18). The request determination unit 212 proceeds to step S12 after subtracting the issued credit amount so as to determine whether the current queue length for the target user flow is positive.

When the credit has not been issued (NO at step S17), the request determination unit 212 terminates the processing operation illustrated in FIG. 12. When the current queue length for the target user flow is not positive (NO at step S12), the request determination unit terminates the processing operation illustrated in FIG. 12. When the bandwidth of the target user flow is not in the normal state (NO at step S13) or when the entry of the target user flow has been already in the FIFO 212A (YES at step S14), the request determination unit 212 terminates the processing operation illustrated in FIG. 12.

When a packet to the target user data is inputted, the request determination unit 212 for the entry storing processing illustrated in FIG. 12 determines whether the current queue length is positive in a case where the bandwidth for the target user flow is updated or the credit to the target user flow has been issued. When the current queue length for the target user flow is positive and the bandwidth of the target user flow is in the normal state, the request determination unit 212 determines whether the entry 41 of the target user flow has been already in the FIFO 212A. The request determination unit 212 stores the entry 41 in the FIFO 212A only when the entry 41 of the target user flow does not exist in the FIFO 212A. As a result, the request determination unit 212 avoids redundant registration of the matched entry 41 to the link list 40, so that one entry/one flow can be realized.

Figure 13:
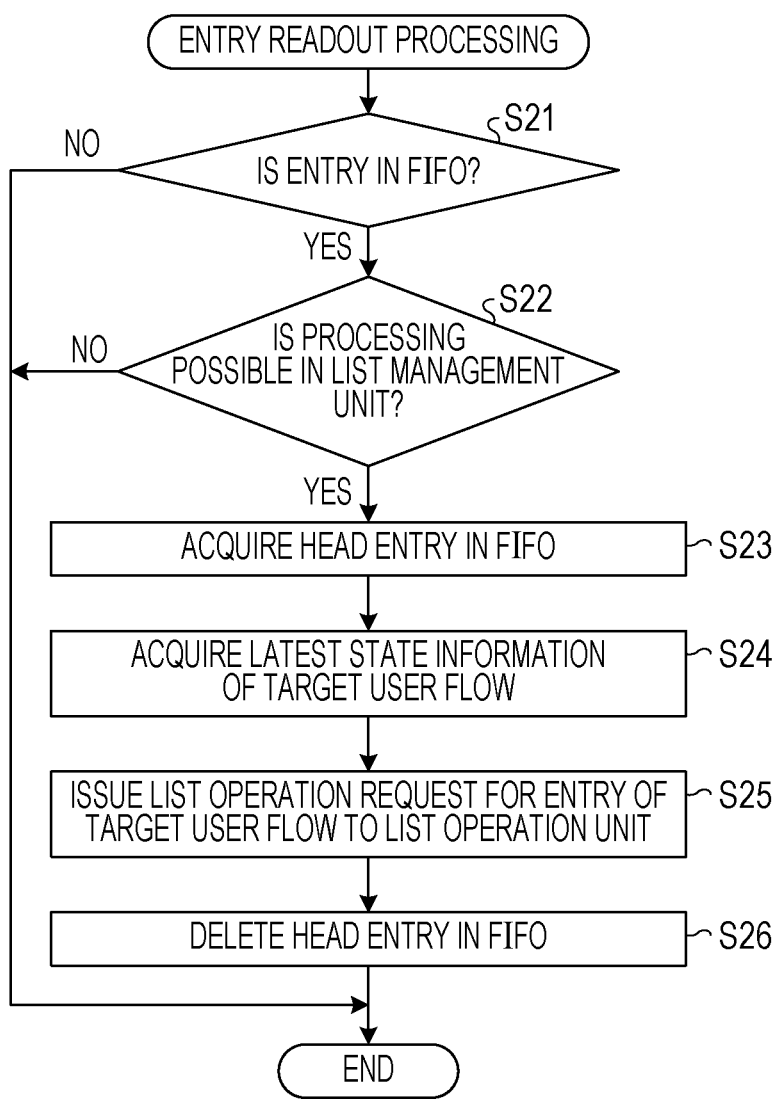
FIG. 13 is a flowchart illustrating an exemplary processing operation for entry readout processing by the addition control unit.

FIG. 13 is a flowchart illustrating an exemplary processing operation for the entry readout processing by the additional control 21. The entry readout processing is to read out the head entry 41 in the FIFO 212A and issue a list operation request relating to the read entry 41.

In FIG. 13, the request determination unit 212 in the addition control unit 21 determines whether the entry 41 exists in the FIFO 212A (step S21). When the entry 41 exits in the FIFO 212A (YES at step S21), the request determination unit 212 determines whether processing is possible in the list management unit 22 (step S22).

When the processing is possible in the list management unit 22 (YES at step S22), the request determination unit 212 acquires the head entry 41 in the FIFO 212A (step S23). The request determination unit 212 acquires the latest state information by referring to the contents of the queue length counter 211A for the target user flow (step S24). The request determination unit 212 issues a list operation request relating to the entry 41 of the target user flow to the list operation unit 221, the request on which the latest state information is reflected after having acquired the latest stated information of the target user flow (step S25). It is noted that the list operation request is a command to request a list operation such as addition, delete, or sorting of the entry 41 from the link list 40. As a result, the list operation unit 221 can recognize the latest state of the target user flow when the head entry in the FIFO 212A is acquired in response to the list operation request from the request determination unit 212. The request determination unit 212 deletes the head entry 41 in the FIFO 212A after having issued the list operation request (step S26) and terminates the processing operation illustrated in FIG. 13.

When the entry 41 does not exist in the FIFO 212A (NO at step S21), the request determination unit 212 terminates the processing operation illustrated in FIG. 13. When the processing is not possible in the list management unit 22 (NO at step S22), the request determination unit 212 terminates the processing operation illustrated in FIG. 13.

When the entry 41 exits in the FIFO 212A and processing is possible in the list management unit 22, the request determination unit 212 for the entry readout processing illustrated in FIG. 13 acquires the latest state information of the target user flow. The request determination unit 212 notifies the list operation unit 221 of the list operation request relating to the entry 41, the request on which the latest state information is reflected. In other words, the list operation unit 221 accepts the list operation request from the request determination unit 212 at timing when processing is possible. As a result, even when a short packet of a different user flow arrives in a short interval, the congestion is adsorbed by temporarily storing the flow number in the FIFO 212A, so that a case where a plurality of list operation requests is concentrated in an interval shorter than the time in which the processing is possible can be handled.

It is noted that the shortest time period of the timing when the list operation request is generated from an arbitrary user flow is a processing time of the shortest packet. However, even when the shortest packet of the same user flow continues, the list operation for the shortest packet has not to be finished within the processing time of the shortest packet because the shortest packet is managed in a unit of the fixed length credit amount. The list operation has only to be finished within a time equivalent to the credit amount.

Figure 14:
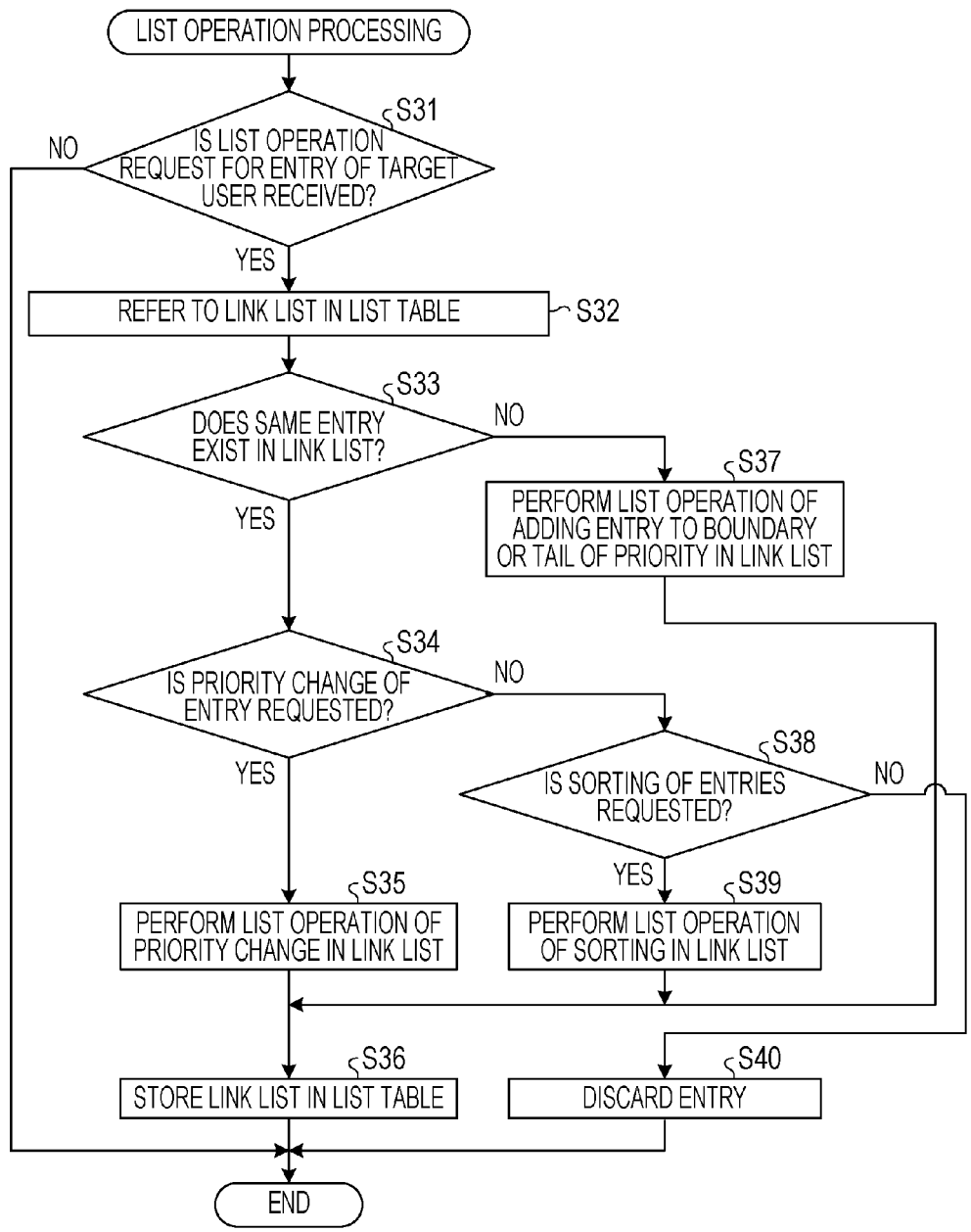
FIG. 14 is a flowchart illustrating an exemplary processing operation for list operation processing by a list operation unit.

FIG. 14 is a flowchart illustrating an exemplary processing operation for the list operation processing by the list operation unit 221. The list operation processing illustrated in FIG. 14 is to execute the list operation of the link list 40 by using the entry 41 relating to the list operation request for the target user flow when the list operation request is received.

In FIG. 14, the list operation unit 221 determines whether the list operation request relating to the entry 41 of the target user flow is received from the request determination unit 212 in the addition control unit 21 (step S31). When the list operation request for the target user flow is received (YES at step S31), the list operation unit 21 refers to the link list 40 in the list table 222 (step S32)

The list operation unit 221 determines whether the matched entry 41 relating to the list operation request exists in the referred link list 40 (step S33). When the matched entry 41 exists in the link list 40 (YES at step S33), the list operation unit 221 determines whether a priority change request for the entry 41 is detected (step S34). It is noted that the priority change request is a request capable of being designated from, for example, an unillustrated management terminal.

When the priority change request for the entry 41 is detected (YES at step S34), the list operation unit 221 executes the list operation of the priority change for the entry 41 in the link list 40 (step S35). It is noted that the list operation to change the priority of the entries 41 is a list operation to change the entry 41 in the link list 40 by designating the boundary 44 to the entry 41 in the link list 40. The list operation unit 221 stores the link list 40 in which the priority of the entries 41 has changed (step S36) and terminates the processing operation illustrated in FIG. 14.

When the matched entry 41 does not exist in the link list 40 (NO at step 33), the list operation unit 221 executes the list operation to add an entry relating to the list operation request to any of the priority boundaries 44 or the tail 43 in the link list 40 (step S37). It is noted that the list operation of adding the entry is a list operation of adding the entry 41 to the priority boundary 44 or the tail 43 in the link list 40. Then, the list operation unit 221 proceeds to step S36 to store the link list 40 in which the entry 41 is added to the priority boundary 44 or the tail 43 in the list table 222.

When the priority change request for the entry 41 is not detected (NO at step S34), the list operation unit 221 determines whether a sorting request to sort the order of the entries 41 in the link list 40 is detected (step S38). When the sorting request is detected (YES at step S38), the list operation unit 221 executes the sorting list operation (step S39). It is noted that the sorting list operation is a list operation to sort the order of arbitrary entries 41 in the link list 40. Then, the list operation unit 221 proceeds to step S36 to sort the link list 40 in which the order of the entries 41 is sorted in the list table 222.

When the sort request is not detected (NO at step S38), the list operation unit 221 discards the correspond entry 41 (step S40) and terminates the processing operation illustrated in FIG. 14. It is noted that the corresponding entry 41 at step S40 is equivalent to an entry to be newly added, or a new entry. When the list operation request relating to the entry 41 of the target user flow is not received (NO at step S31), the list operation unit 221 terminates the processing operation illustrated in FIG. 14.

When the list operation request of the target user flow is received, the list operation unit 221 for the list operation processing illustrated in FIG. 14 determines whether the entry matching with the entry 41 relating to the list operation request exists in the link list 40. When the matched entry 41 as the entry 41 relating to the list operation request does not exist in the link list 40, the list operation unit 221 executes the list operation of adding the entry 41 of the list operation request to the boundary 44 or tail 43 of the priority in the link list 40. As a result, the list operation unit 221 is capable of sequentially adding the entry 41 to the boundary 44 or tail 43 of the priority of the link list 40. It is noted that the list operation of adding the entry 41 includes the list operation of the link list 40 to dispose the new entry 41 in the head 42.

When the entry 41 matching with the entry 41 relating to the list operation request exists in the link list 40 and the link operation request is a priority change request, the list operation unit 221 executes the list operation to set the priority of the entries 41 according to the designated boundary 44. As a result, the list operation unit 221 is capable of freely setting the priority of the entries 41 in the link list 40.

When the entry 41 matching with the entry 41 of the list operation request exits in the link list 40 and the list operation request is a sorting request, the list operation unit 221 executes the list operation to sort the entries 41 in the link list 40. As a result, the list operation unit 221 is capable of easily sorting the entries 41 in the link list 40.

Every time the credit for the user flow of the entry 41 of the head 42 in the link list 40 has been issued, the list operation unit 221 deletes the corresponding entry 41 from the link list 40. When the entry 41 of the head 42 is capable of being added again to the link list 40, the list operation unit 221 adds and registers the entry 41 of the link list 40 in the FIFO 212A. As a result, the output control unit 33 sequentially outputs the packet from the output queue 32A for the user flow of the entry 41 from the head 43 to the tail 43 of the link list 40, so that an operation similar to that of the RR scheme is realized.

Figure 15A:
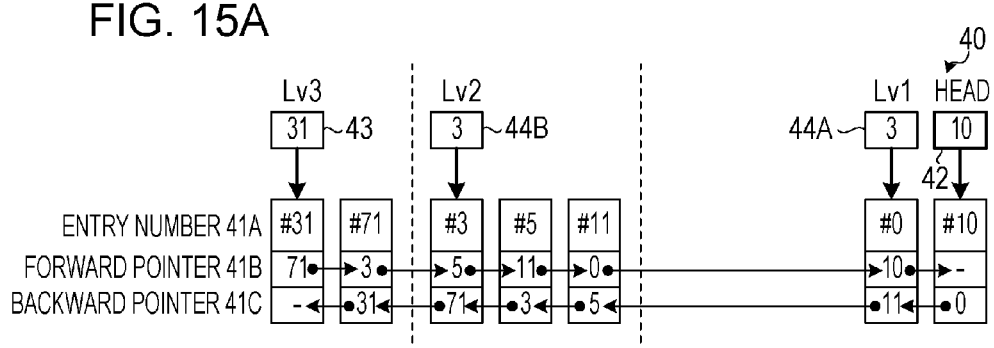
FIGS. 15A to 15C are diagrams illustrating an exemplary entry change transition in a link list in a list operation of sorting.
Figure 15B:
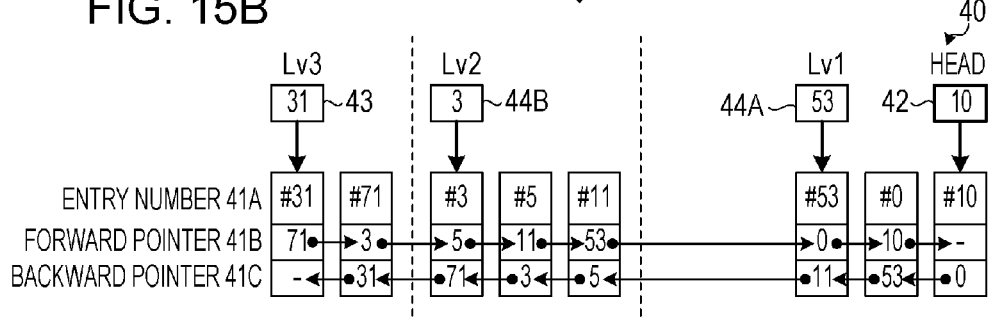
Figure 15C:
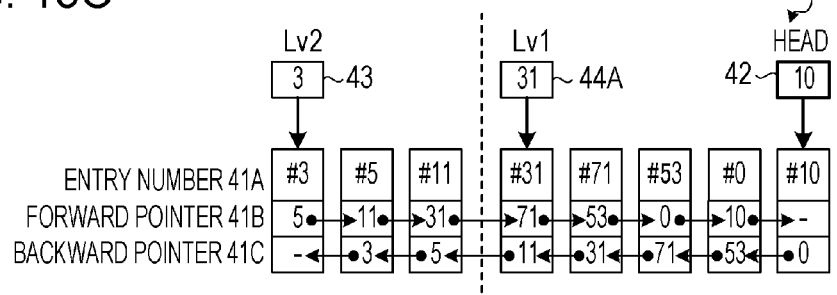

Hereafter, the sorting list operation is described. FIGS. 15A to 15C are diagrams illustrating an exemplary change transition of the entries 41 of the link list 40 in the sorting list operation. The link list 40 in FIG. 15A is arrayed as the entries 41 in a section between the head 42 and the tail 43 in the order of the entry numbers #10, #0, #11, #5, #3, #71, and #31. Then, a first boundary 44A is set in the entry number #0, a second boundary 44B is set in the entry number #3, and the tail 43 is set in the entry number #31. As a result, a first priority Lv1 is set in the entry numbers #10 and #0, a second priority Lv2 is set in the entry numbers #11, #5, and #3, and a third priority Lv3 is set in the entry numbers #71 and #31.

Next, the list operation of sorting the entry number #53 of a new user flow to the first priority level Lv1 is described. As illustrated in FIG. 15B, the list operation unit 221 executes the list operation of arranging the new entry number #53 just after the entry number #0 in the link list 40. At this time, the forward pointer 41B and backward pointer 41C of the entry number #53 are, of course, changed, and also the backward pointer 41C of the entry number #0 is changed from #11 to #53 and the forward pointer 41B of the entry number #11 is changed from #0 to #53. As a result, the list operation unit 221 is capable of easily inserting the new entry number #53 between the entry number #10 and the entry number #11 in the link list 40.

In addition, the list operation to sort the entry numbers #71 and #31 of the third priority Lv3 in the link list 40 to the first priority Lv1 is described. As illustrated in FIG. 15C, the list operation unit 221 executes the list operation to array the entry numbers #71 and #31 just after the entry number #53 in the link list 40. At this time, the forward pointer 41B and backward pointer 41C of the entry numbers #71 and #31 are, of course, changed, and also the backward pointer 41C of the entry number #53 is changed from #11 to #71 and the forward pointer 41B of the entry number #11 is changed from #53 to #31. As a result, the list operation unit 221 is capable of easily setting the entry numbers #71 and #31 with the third priority Lv3 in the link list 40 to the first priority Lv1.

FIG. 16 is a flowchart illustrating an exemplary processing operation for first packet output processing by the output control unit 33. The first packet output processing is to output packets in a unit of packet from the output queue 32A for the credit counter 33A which has acquired the issued credit.

In FIG. 16, the output control unit 33 determines whether the issued credit is acquired from the issuing unit 224 (step S51). When the issued credit is acquired (YES at step S51), the output control unit 33 updates the current credit amount by adding the issued credit amount to the current credit amount of the credit counter 33A of the output queue 32A for the target user flow (step S52). The output control unit 33 determines whether the current credit amount is positive (a plus value) (step S53). When the current credit amount is positive (YES at step S53), the output control unit 33 determines whether a packet that can be outputted exists in the output queue 32A for the target user flow (step S54).

When the packet that can be outputted exists in the output queue 32A for the target user flow, the output control unit 33 outputs the packet from the output queue 32A in a unit of packet (step S55). The output control unit 33 updates the current credit amount by subtracting the output packet length form the current credit amount in the credit counter 33A for the target user flow (step S56).

The output control unit 33 determines whether a packet that can be outputted exists in the output queue 32A for the target user flow (step S57). When the packet that can be outputted does not exist in the output queue 32A for the target user flow (NO at step S57), the processing operation illustrated in FIG. 16 is terminated.

When the packet that can be outputted exists in the output queue 32A for the target user flow (YES at step S58), the output control unit 33 determines whether the current credit amount for the target user flow is positive (step S58). When the current credit amount is positive (YES at step S58), the output control unit 33 proceeds to M1 in FIG. 16 to output the packet from the output queue 32A for the target user flow.

When the current credit amount is not positive (NO at step S58), the output control unit 33 proceeds to step S51 to determine whether the issued credit is acquired.

When the issued credit is not acquired (NO at step S51), the output control unit 33 terminates the processing operation illustrated in FIG. 16. Also, when the current credit amount is not positive (NO at step S53), the output control unit 33 determines whether a packet that can be outputted exists in the output queue 32A (step S59). When the packet that can be outputted exists in the output queue 32A (YES at step S59), the output control unit 33 proceeds to the step S51 to determine whether the issued credit is acquired.

When the packet that can be outputted does not exist in the output queue 32A for the target user flow (NO at step S59), the output control unit 33 proceeds to M2 in FIG. 16 to terminate the processing operation illustrated in FIG. 16. Also, when the packet that can be outputted does not exist in the output queue 32A for the target user flow (NO at step S54), the output control unit 33 terminates the processing operation illustrated in FIG. 16.

When the current credit amount of the credit counter 33A for the target user flow is positive and a packet that can be outputted exists in the corresponding output queue 32A, the output control unit 33 outputs packets in a unit of packet from the output queue 32 for the target user flow. As a result, the output control unit 33 is capable of sequentially outputting the packets of the target user flow until the current credit amount becomes equal to or smaller than 0.

When the current credit amount is equal to or smaller than 0 and the packet that can be outputted exists in the corresponding output queue 32A, the output control unit 33 waits for outputting a packet until a credit is acquired from the issuing unit 224. When the issued credit is acquired, the output control unit 33 updates the current credit amount by adding the issued credit amount to the current credit amount, and, when the current credit amount becomes positive, the output control unit 33 outputs packets in a unit of packet from the corresponding output queue 32A. As a result, the output control unit 33 is capable of sequentially outputting packets of the output queue 32A for the target user data in a unit of packet until the current credit amount becomes equal to or smaller than 0.

FIG. 17 is a flowchart illustrating an exemplary processing operation for second packet output processing by the output control unit 33. The second packet output processing is to output packets in a unit of packet from the output queue 32A for the target user flow when the packet is inputted from the EnQ unit 31.

The output control unit 33 in FIG. 17 determines whether the packet is inputted from the EnQ unit 31 (step S61). When the packet is inputted (YES at step S61), the output control unit 33 stores the input packet in the output queue 32A for the target user flow (step S62) and determines whether the current credit amount is positive (step S63).

When the current credit amount is positive (YES at step S63), the output control unit 33 outputs the packets in a unit of packet from the output queue 32A (step S64). The output control unit 33 updates the current credit amount by subtracting the output packet length from the current credit amount in the credit counter 33A for the target user flow (step S65) and terminates the processing operation illustrated in FIG. 17. When the packet is not inputted from the EnQ unit 31 (NO at step S61), the output control unit 33 terminates the processing operation illustrated in FIG. 17. When the current credit amount is not positive (NO at step S63), the output control unit 33 terminates the processing operation illustrated in FIG. 17.

When the current credit amount of the credit counter 33A for the target user flow is positive and the packet that can be outputted exists in the corresponding output queue 32A, the output control unit 33 outputs packets in a unit of packet from the output queue 32A for the target user flow. As a result, the output control unit 33 is capable of outputting the packets of the target user flow in a unit of packet until the current credit amount becomes equal to or smaller than 0.

When the current credit amount is equal to or smaller than 0 and the packet that can be outputted exists in the corresponding output queue 32A, the output control unit 33 waits for outputting the packet until a credit from the issuing unit 224 is acquired. When the issued credit is acquired, the output control unit 33 updates the current credit amount by adding the issued credit amount to the current credit amount, and, when the current credit amount becomes positive, the output control unit 33 outputs packets in a unit of packet from the corresponding output queue 32A. As a result, the output control unit 33 is capable of sequentially outputting the packets of the output queue 32A for the target user flow in a unit of packet until the current credit amount becomes equal to or smaller than 0.

Figure 18:
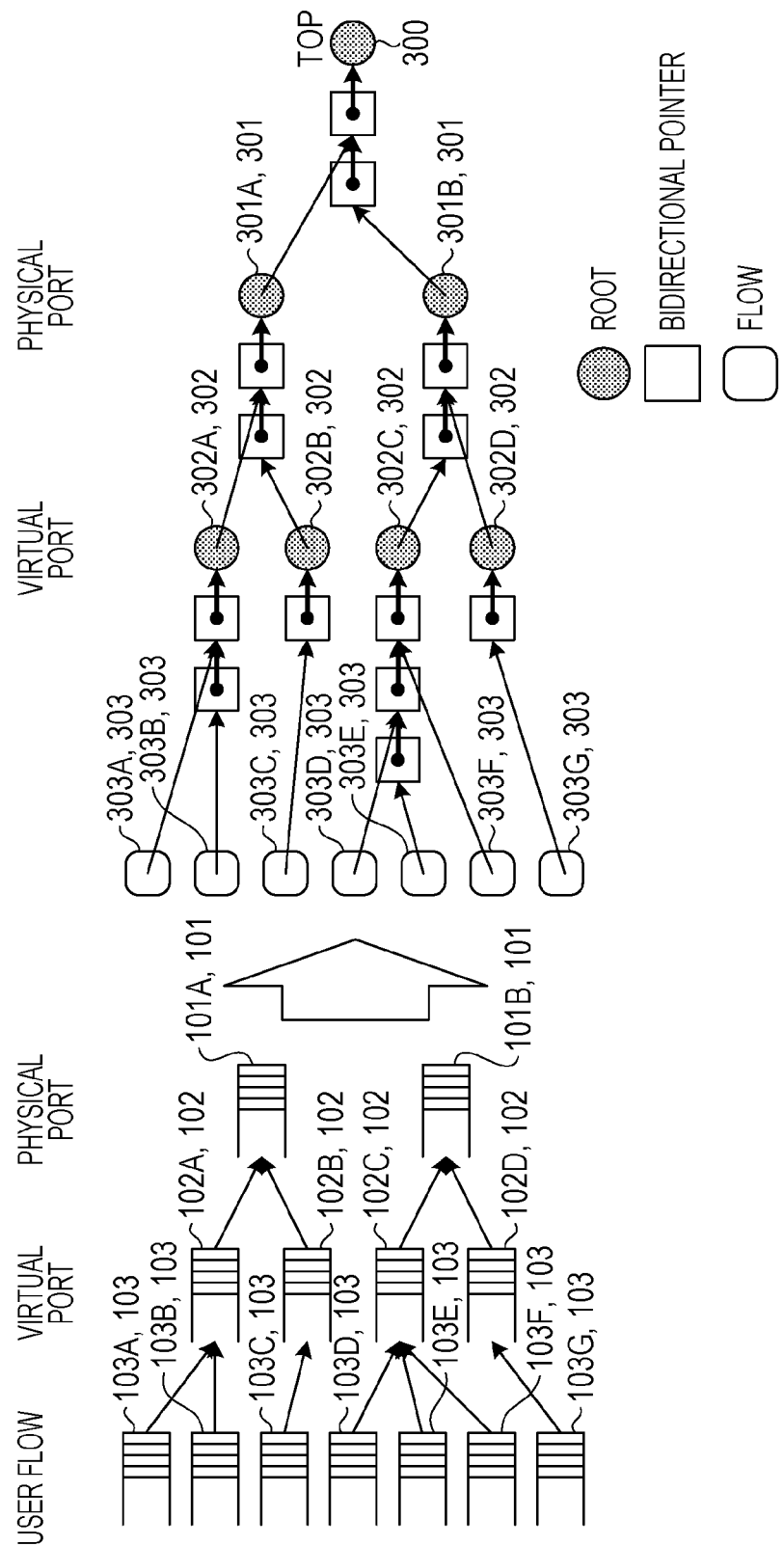
FIG. 18 is a diagram illustrating an exemplary queue hierarchical structure.

The link list 40 indicating the output order of the user flows in a single-level queue hierarchy is illustrated for convenience of the description. However, a general transmission system includes multi-level queue hierarchical structure such as a physical port, a virtual port, and a user flow. Accordingly, an entire link list relating to the multi-level queue hierarchical structure is described. FIG. 18 is a diagram illustrating an exemplary queue hierarchical structure. The queue hierarchical structure in FIG. 18 is a hierarchical structure including a line 100, a physical port 101 having a lower hierarchical relationship with the line 100, a virtual port 102 having a lower hierarchical relationship with the physical port 101, and a user flow 103 having a lower hierarchical relationship with the virtual port 102.

The transmission apparatus 3 manages the entre link list as a link list of the entire queue hierarchical structure. The entire link list manages an entry 300 identifying the line 100, an entry 301 identifying a physical port number of the physical port 101, an entry 302 identifying a virtual port number of the virtual port 102, and an entry 303 identifying a flow number of the user flow 103 with a bidirectional pointer. For example, a connection order of the entry 300 of the line 100 is from an entry 301A of a physical port 101A to an entry 301B of a physical port 101B. The connection order of the entry 301A of the physical port 101 is from an entry 302A of a virtual port 102A to an entry 302B of a virtual port 102B. Furthermore, the connection order of an entry 302A of a virtual port 102A is from an entry 303A of a user flow 103A to an entry 303B of a user flow 103B. Also, the connection order of an entry 301B of a physical port 101B is from an entry 302D of a virtual port 102D to an entry 302C of a virtual port 102C. In addition, the connection order of an entry 302C of a virtual port 102C is in the order of an entry 303F of a user flow 103F, an entry 303D of a user flow 103D, and an entry 303E of a user flow 103E.

Figure 19:
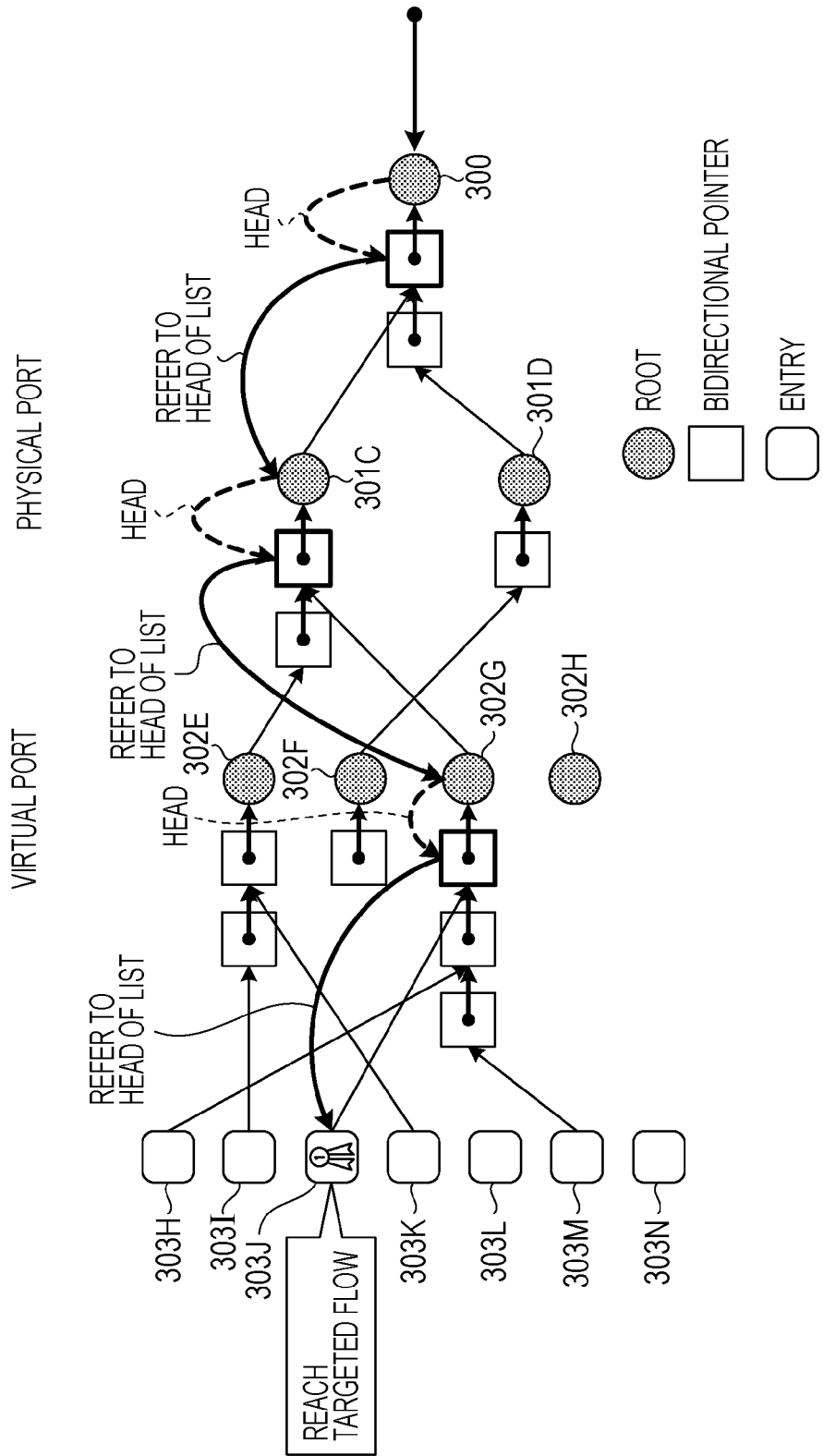
FIG. 19 is a diagram illustrating an exemplary reference operation of an entire link list in the queue hierarchical structure.

FIG. 19 is a diagram illustrating an exemplary referring operation of the entire link list on the queue hierarchical structure. As an example of the entire link list in FIG. 19, the connection order of the entries 300 of the line is from an entry 302F of the virtual port to an entry 302E of the virtual port. Furthermore, the connection order of the entry 302G of the virtual port is in the order of an entry 303J of the user flow, an entry 303H of the user flow, and an entry 303M of the user flow. The list management unit 22 refers to the entire link list to identify a transmission path in the order of the entry 300 of the line, the entry 301C of the physical port, the entry 302G of the virtual port and the entry 303J of the user flow. Furthermore, the list management unit 22 is capable of identifying a reverse path in the order of the entry 303J of the user flow, the entry 302G of the virtual port, the entry 301C of the physical port, and the entry 300 of the line. In this case, the schedule management unit 20 provides the addition control unit 21 and the list management unit 22 for each queue hierarchy level. Accordingly, the schedule management unit 20 provides the addition control unit 21 and the list management unit 22 for the number of the queue hierarchies when multiple queue hierarchies are structured. The entire management unit 23 manages the addition control unit 21 and the list management unit 22 for each queue hierarchy level.

The entire management unit 23 manages the addition control unit 21 and the list management unit 22 for each queue hierarchy level to determine whether a user flow that can be outputted exists. When the user flow that can be outputted exists, the entire management unit 23 refers to the entire link list and issue a credit to the credit counter 33A of the output queue 32A of the target user flow by following the physical port, the virtual port, and the head entry for each queue hierarchy level of the user flow.

Figure 20:
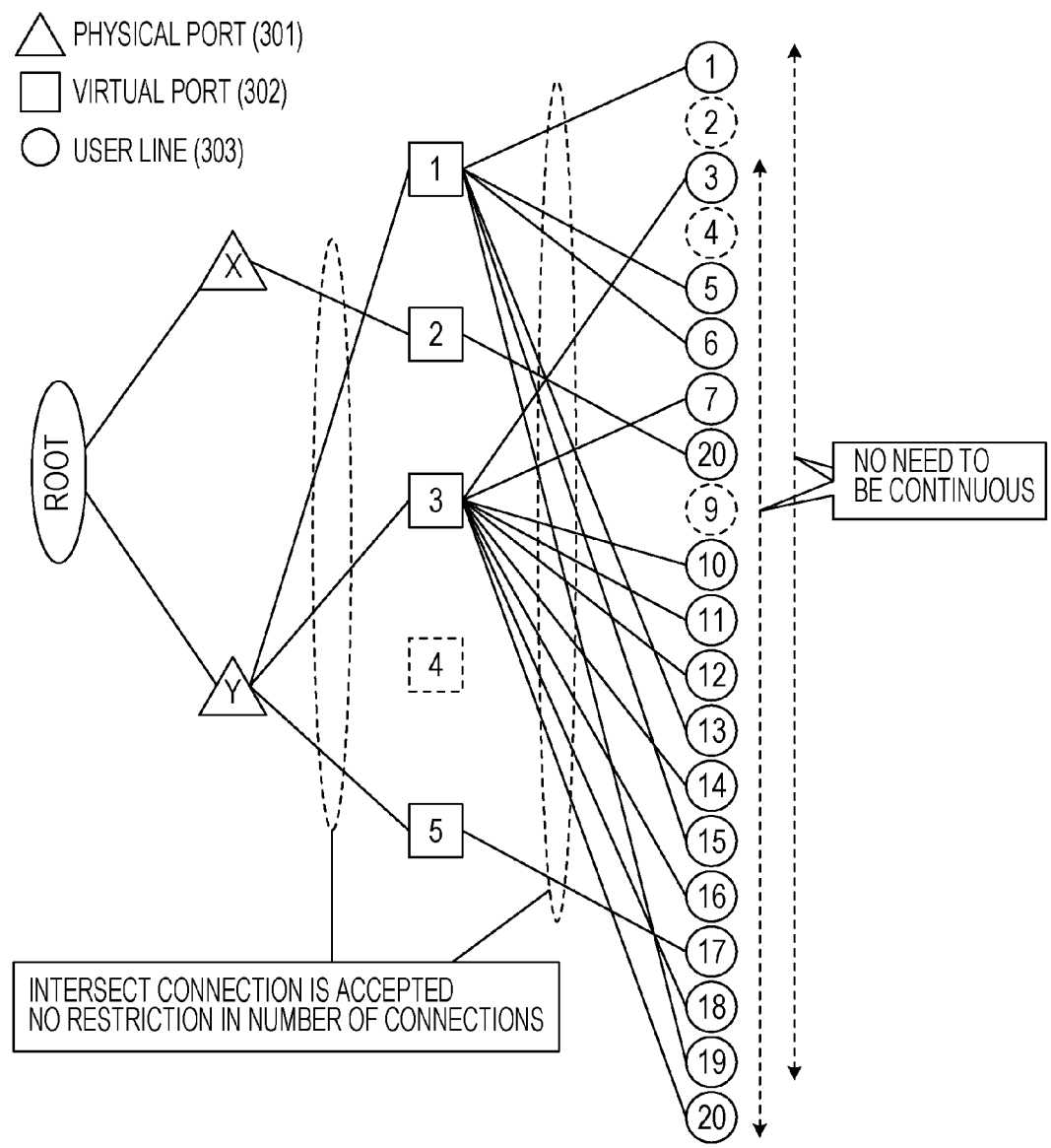
FIG. 20 is a diagram illustrating an exemplary queue hierarchical structure.

FIG. 20 is a diagram illustrating an exemplary queue hierarchical structure. The transmission apparatus 3 has a varying connection relationship between the queue hierarchies as illustrated in the entire link list, so as to be capable of flexibly accepting the multi-level queue configuration. In the conventional RR scheme, a relationship between the upper hierarchy level and the lower hierarchy level is fixed, and, thus, there are various limitations in terms of continuity, the number of connections, and a connection relationship. A queue in a lower hierarchy level to be connected to an arbitrary queue in an upper hierarchy level is assigned in continuity. Furthermore, the number of connections between the hierarchies is fixed and the connection relationship of the variation of the lower hierarchy level and the variation of the upper hierarchy level does not intersect with each other. Moreover, a reverse conversion table has to be included to reversely follow the queue connection information until the target user flow is found from the upper hierarchy level. On the other hand, in the queue hierarchical structure using the entire link list of the embodiment, arbitrary entry information is capable of being added to each hierarchy level, so that not only the entire transmission path but also the reverse path are identifiable by referring to the entire link list. The queue hierarchical structure illustrated in FIG. 20 freely assigns the connection port of the lower hierarchy level to the connection port of the arbitrary upper hierarchy level, has the free number of connections of each hierarchy level, and, also, permits the connection relationship in which the variation of the lower hierarchy level and the variation of the upper hierarchy level intersect with each other. As a result, in the queue hierarchical structure, there are no various limitations in terms of continuity, the number of connections, and the connection relationship and the queue hierarchical structure can flexibly accept the multi-level queue hierarchical structure. Moreover, the transmission apparatus 3 determines the connection port to be referred by referring to the head in the entire link list. Thus, the reverse conversion table does not have to be included.

The transmission apparatus 3 according to the embodiment is provided with the output queue 32A for each user flow and stores the input packet in the output queue 32A for the user flow to which the corresponding packet belongs. The transmission apparatus 3 refers to the head entry 41 in the link list 40 indicating the user flow output order and issues a credit to the credit counter 33A of the output queue 32A for the user flow of the head entry 41. The transmission apparatus 3 outputs the packets in a unit of packet from the output queue 32A to which the credit is issued. As a result, the user flow is found by referring to the head entry 41 in the link list 40, so that deterioration of the packet transmission performances may be avoided.

The transmission apparatus 3 regularly refers to the head entry 41 in the link list 40 and issues a fixed-length credit to the credit counter 33A for the user flow of the head entry 41, and selects a queue within a time equivalent for credit amount of the credit. As a result, the selection of the output queue 32A has to be completed within a time equivalent to the fixed-length credit amount, so that deterioration of the packet transmission performances may be avoided.

When the packet for the target user flow is outputted, the transmission apparatus 3 updates the current credit amount by subtracting the output packet length from the current credit amount for the target user flow. When the packet exists in the output queue 32A for the target user flow and the current credit amount for the target user flow is positive, the transmission apparatus 3 outputs the packets in the output queue 32A in a unit of packet. As a result, the transmission apparatus 3 terminates the selection of the output queue 32A within a time equivalent to the fixed-length credit amount even when the bandwidth is widened and sequentially outputs the packets of the target user flow in a unit of packet. Accordingly, deterioration of the packet transmission performances may be avoided.

The transmission apparatus 3 regularly refers to the head entry 41 in the link list 40 and issues the fixed-length issued credit to the credit counter 33A corresponding to the user flow of the head entry 41. As a result, when the packet exists in the output queue 32A for the target user flow, the transmission apparatus 3 can output the packets in the output queue 32A in a unit of packet in response to the issue of the packet.

The transmission apparatus 3 outputs packets in a unit of packet from the output queue 32A for the target user flow using the link list 40. Accordingly, as compared to the conventional RR scheme, even when the number of user flows increases, only the number of entries in the link list 40 increases. Thus, the transmission apparatus 3 can flexibly accept an increase of the number of user flows without increasing the number of lines.

The transmission apparatus 3 outputs packets in a unit of packet from the output queue 32A for the target user flow of the head entry 41 using the link list 40. As a result, the transmission apparatus 3 sequentially outputs the packet of the input user flow by following the arrangement of the link list 40, so that packet delay with which the packet is incapable of being outputted according to the input order can be caused to avoid.

Even when a packet of different user flow is inputted, the transmission apparatus 3 temporarily stores the entry 41 of each user flow in the FIFO 212A and waits until a list operation of processing the link list 40 becomes possible in the list operation unit 221. As a result, the transmission apparatus 3 can reduce a processing load of the list operation for the link list 40 for each user flow in the list operation unit 221.

When the current queue length according to the target user flow is positive and the bandwidth of the line for the target user flow is in the normal state, the transmission apparatus 3 determines whether the entry 41 of the target user flow exists in the FIFO 212A. When the entry 41 of the target user flow is already stored in the FIFO 212A, the transmission apparatus 3 prohibits the entry 41 from being registered in the FIFO 212A. When the entry 41 is not stored in the FIFO 212A, the transmission apparatus 3 registers the entry 41 in the FIFO 212A. As a result, the transmission apparatus 3 avoids redundant registration of the matched entry 41 to the link list 40 in the FIFO 212A, so that one entry/one flow can be realized.

The transmission apparatus 3 executes the list operation of inserting the entry 41 in the FIFO 212A into a proper position in the link list 40 in a state where the entry exists in the FIFO 212A and the processing is possible in the list operation unit 221. As a result, the transmission apparatus 3 can reduce a processing load of the list operation for the link list 40 in the list operation unit 221.

The transmission apparatus 3 allows a boundary 44 to be designated between the entries 41 consecutive in the link list 40, and sets priorities in sections of the entries 41 which are sectioned by the boundary 44, the head 42, and the tail 43. As a result, the transmission apparatus 3 can more easily set the priority in a unit of user flow, so that the priority can be flexibly changed as compared with the conventional RR scheme. Moreover, the transmission apparatus 3 can flexibly change the priority without changing the circuit configuration even when the change of priority, for example, new addition, delete, or sorting of the priority occurs.

The transmission apparatus 3 can add arbitrary entry for each hierarchy level to the entire link list and can identity not only the entire transmission path but also a reverse path by referring to the entire link list. In the queue hierarchical structure, the connection port in the lower hierarchy level is freely assigned to the connection port of arbitrary upper hierarchy level and the number of connections for each hierarchy level is flexible. Moreover, the connection relationship in which the variation of the lower hierarchy level and the variation of the upper hierarchy level intersect with each other is permitted. As a result, in the queue hierarchical structure, for example, there are no limitations in terms of continuity, the number of connections, and connection relationship, and the multi-level queue hierarchical structure can be flexibly accepted. Moreover, the transmission apparatus 3 has not to include the reverse conversion table because a connection port to be referred next can be seen by referring to the head in the entire link list.

The transmission apparatus 3 manages the forward pointer 41B and the backward pointer 41C corresponding to the entries 41 before and after the entry 41 for each entry number 41A in the link list 40. As a result, the list operation of sorting the entry 41 can be easy by changing the forward pointer 41B and the backward pointer 41C of each entry 41 in the link list 40.

Even when the short packet of the same user flow is inputted in a short interval, the transmission apparatus 3 has not to terminate the list operation within the time of processing the shortest packet because the list operation is managed in a unit of the fixed-length credit amount. Accordingly, the list operation has only to be terminated within a fixed-length processing time. Thus, deterioration of the packet transmission performances may be avoided.

In the transmission apparatus 3, the concept of packet is not used in the processing of queue selection, so that a time used for selecting an output queue does not depend on the packet length. Accordingly, a high-speed scheduling can be realized without being affected by shortening the processing time of the shortest packet in association of providing a higher-speed line.

The transmission apparatus 3 uses the link list 40 and thus has to make a several accesses to the list table 222 in which the link list 40 is stored. However, the access is executed in a unit of the user flow, not a unit of packet, so that the number of accesses can be inhibitory minimized.

Since the conventional RR scheme desires retrieval processing for the number of user flows, limitations in increasing the processing speed or the number of user flows have been recognized. On the other hand, in the embodiment, even when the number of users increases, many flows can be processed at a higher speed without being affected by the processing time to determine a next output queue 32A capable of being outputted only by following the entries 41 in the link list from the head.

Also, in the conventional RR scheme, data which has been already arrived is often kept waiting before being outputted in accordance with the relationship between the selection order and the arrival order. On the other hand, in the embodiment, when a priority is not set, data is added to the tail 43 of the link list 40 in order of arrival. Thus, data delay can be caused to avoid.

In the conventional RR scheme, when the queue hierarchy is structured in the form of multiple levels, the circuit configuration has to be changed in consideration of the restrictions of continuity, the number of connections, and connection relationship. Thus, queue configuration flexibility is low. On the other hand, in the embodiment, employed is a system in which a target user flow can be selected by following the head in the entire link list by using the entire link list. As a result, there is no limitation in continuity, the number of connections, and connection relationship. Thus, the flexibility of configuring the queue hierarchical structure can be increased.

It is noted that the transmission apparatus 3 according to the embodiment is exemplified as a pizza-box type transmission apparatus but is also applicable to a chassis-type transmission apparatus provided with the transmission apparatus 3 on a line card.

The description is given of the transmission apparatus 3 having an issued credit amount of 1024 bytes for each user flow. However, the credit amount may be a data amount to which a time at least longer than a processing time for queue selection is converted.

As the transmission apparatus 3, a packet transmission apparatus configured to transmit a variable length packet is exemplified. However, the transmission apparatus 3 is applicable to a transmission apparatus configured to transmit a fixed-length packet. Furthermore, the transmission apparatus 3 is also applicable to a transmission apparatus configured to transmit data which is not limited to packets but data of variable length or fixed-length.

Also, the configuration elements of illustrated unit do not have to be physically configured as illustrated. In other words, specific embodiments of dispersion or integration of the units are not limited to those illustrated, and can be functionally or physically configured by dispersing and integrating one part or all thereof in an arbitrary unit according to various loads, usage conditions, or the like.

Furthermore, all or any part of various processing functions which are performed in each apparatus may be executed on a central processing unit (CPU) (or microcomputers such as a micro processing unit (MPU)), a micro controller unit (MCU)). Obviously, all or any part of the various processing functions may be also executed on a program to be analyzed on a CPU (or a microcomputer such as an MPU or an MCU) or a wired logic of hardware.

Figure 21:
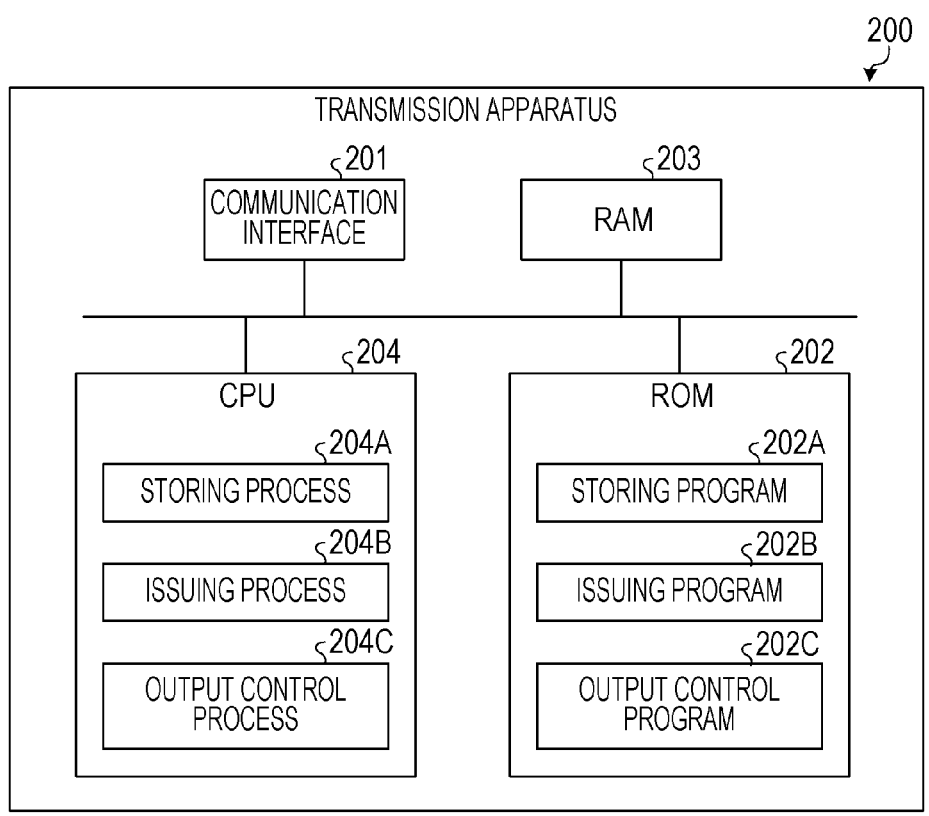
FIG. 21 is a diagram illustrating a transmission apparatus configured to execute a transmission program.

And now, the above-described various processing of the embodiment may be realized by installing a prepared program in a transmission apparatus. Accordingly, the description is given of an example of a transmission apparatus configured to execute a program having functions similar to those of the embodiment. FIG. 21 is a diagram illustrating a transmission apparatus 200 configured to execute a transmission program.

In FIG. 21, the transmission apparatus 200 to execute a transmission program has a communication interface 201, a ROM 202, a RAM 203, and a CPU 204.

The transmission program performing functions similar to those of the embodiment is stored in advance in the ROM 202. The transmission program may be recorded not in the ROM 202 but in a recording medium readable by an unillustrated drive. The recording medium may include portable recording media such as a CD-ROM, a DVD disc, a USB memory, and an SD card, or semiconductor memories such as a flash memory. The transmission program may be acquired from a storage device capable of performing communications through a network. As illustrated in FIG. 21, the transmission program is a storage program 202A, an issued program 202B and an output control program 202C. It is noted that the programs 202A, 202B, and 202C may be properly integrated or dispersed.

The CPU 204 reads these programs 202A, 202B, and 202C from the ROM 202 and executes the read programs. In addition, the CPU 204 functions as an issuing process 204B and an output control process 204C. The link list indicating the order of outputting the user flows is stored in the RAM 203.

The CPU 204 has a queue in the RAM 203 for each user flow and stores the input data in a queue for the user flow to which the data belongs. The CPU 204 refers to the link list indicating the order of outputting the user flows and issues a predetermined output permissible amount to the queue for the user flow. The CPU 204 outputs the data from the queue to which the output permissible amount is issued. As a result, the transmission apparatus 200 may avoid deterioration of data transmission performances.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus, comprising:
    a buffer storing data of user flows in queues, respectively;
    a storage configured to store linked lists indicating output orders of entries in the user flows;
    at least one memory storing instructions; and
    at least one processor that executes the instructions to provide:
        an issuing unit configured to issue a predetermined output permissible amount to the queues for the user flows by referring to the link lists, and
        an output control unit configured to select a queue from the queues and to output data from the selected queue in accordance with the output permissible amount issued to the selected queue, wherein the output permissible amount is a fixed length data amount corresponding to a time that is greater than or equal to a processing time required for the output control unit to select a queue;
        a determination unit configured to, at a first timing, determine whether an entry of a target user flow of the user flows has been already stored in a temporary storage for the target user flow;
        a storage control unit configured to prohibit the entry of the target user flow from being stored in the temporary storage if the entry of the target user flow has been already stored in the temporary storage, and to store the entry of the target user flow in the temporary storage if the entry of the target user flow has not been stored in the temporary storage;
        an execution unit configured to, at a second timing, execute a list operation of adding the entry stored in the temporary storage to a link list of the link lists corresponding to the target user flow; and
        a queue length calculation unit configured to, for each user flow of the user flows, calculate a current queue length by adding a data amount for the user flow, and update the current queue length by subtracting the output permissible amount from the current queue length in response to an issue of the output permissible amount for the user flow,
    wherein the determination unit detects the first timing at which an additional event to a link list of the link lists corresponding to the user flow is generated when the current queue length for the user flow is positive and a bandwidth for the user flow is in a normal state.

2. The transmission apparatus according to claim 1, wherein the at least one processor executes the instructions to further provide:
    a calculation unit configured to, when data is outputted from the selected queue, calculate a current permissible amount for the user flow of which data is stored in the selected queue, by subtracting an output amount of the data from the output permissible amount for the user flow,
    wherein the output control unit outputs data from the selected queue for the user flow of which data is stored in the selected queue when the current permissible amount for the user flow is positive.

3. The transmission apparatus according to claim 2, wherein
    the output control unit stops data output from the selected queue for the user flow of which data is stored in the selected queue when the current permissible amount for the user flow is not positive.

4. The transmission apparatus according to claim 1, wherein
    the execution unit sets a boundary in entries included in the link list of the link lists corresponding to the target user flow and sets a priority of data output to one or more of the entries sectioned by the boundary.

5. The transmission apparatus according to claim 4, wherein
    in the link list of the link lists corresponding to the target user flow, each entry is managed by associating identification information of the entry with identification information of entries before and after the entry.

6. The transmission apparatus according to claim 1, wherein
    the execution unit detects the second timing when the entry exists in the storage and processing is possible in the execution unit.

7. A transmission method, comprising:
    storing data of user flows in a queues, respectively;
    issuing a predetermined output permissible amount to the queues for the user flows by referring to link lists indicating output orders of entries in the user flows;
    selecting a queue from the queues;
    outputting data from the selected queue in accordance with the output permissible amount issued to the selected queue, wherein the output permissible amount is a fixed length data amount corresponding to a time that is greater than or equal to a processing time required for the selecting to select a queue;
    determining, at a first timing, whether an entry of a target user flow of the user flows has been already stored in a temporary storage for the target user flow;
    prohibiting the entry of the target user flow from being stored in the temporary storage if the entry of the target user flow has been already stored in the temporary storage, and storing the entry of the target user flow in the temporary storage if the entry of the target user flow has not been stored in the temporary storage;
    executing, at a second timing, a list operation of adding the entry stored in the temporary storage to a link list of the link lists corresponding to the target user flow; and
    calculating, for each user flow of the user flows, a current queue length by adding a data amount for the user flow, and updating the current queue length by subtracting the output permissible amount from the current queue length in response to an issue of the output permissible amount for the user flow, wherein the determining detects the first timing at which an additional event to a link list of the link lists corresponding to the user flow is generated when the current queue length for the user flow is positive and a bandwidth for the user flow is in a normal state.

8. A non-transitory computer-readable recording medium having a program that causes a computer to execute a procedure, the procedure comprising:

storing data of user flows in queues, respectively;

issuing a predetermined output permissible amount to the queues for the user flows by referring to link lists indicating output orders of entries in the user flows;

selecting a queue from the queues;

outputting data from the selected queue in accordance with the output permissible amount issued to the selected queue, wherein the output permissible amount is a fixed length data amount corresponding to a time that is greater than or equal to a processing time required for the selecting to select a queue;

determining, at a first timing, whether an entry of a target user flow of the user flows has been already stored in a temporary storage for the target user flow;

prohibiting the entry of the target user flow from being stored in the temporary storage if the entry of the target user flow has been already stored in the temporary storage, and storing the entry of the target user flow in the temporary storage if the entry of the target user flow has not been stored in the temporary storage;

executing, at a second timing, a list operation of adding the entry stored in the temporary storage to a link list of the link lists corresponding to the target user flow; and calculating, for each user flow of the user flows, a current queue length by adding a data amount for the user flow, and updating the current queue length by subtracting the output permissible amount from the current queue length in response to an issue of the output permissible amount for the user flow, wherein the determining detects the first timing at which an additional event to a link list of the link lists corresponding to the user flow is generated when the current queue length for the user flow is positive and a bandwidth for the user flow is in a normal state.

* * * * *